US012581099B2

(12) United States Patent
Takahashi et al.

(10) Patent No.: US 12,581,099 B2
(45) Date of Patent: Mar. 17, 2026

(54) INFORMATION PROCESSING DEVICE AND METHOD

(71) Applicant: Sony Group Corporation, Tokyo (JP)

(72) Inventors: Ryohei Takahashi, Tokyo (JP);
Mitsuhiro Hirabayashi, Tokyo (JP)

(73) Assignee: SONY GROUP CORPORATION,
Tokyo (JP)

( * ) Notice: Subject to any disclaimer, the term of this patent is extended or adjusted under 35 U.S.C. 154(b) by 329 days.

(21) Appl. No.: 18/000,396

(22) PCT Filed: May 28, 2021

(86) PCT No.: PCT/JP2021/020355
§ 371 (c)(1),
(2) Date: Dec. 1, 2022

(87) PCT Pub. No.: WO2021/251173
PCT Pub. Date: Dec. 16, 2021

(65) Prior Publication Data
US 2023/0224482 A1     Jul. 13, 2023

Related U.S. Application Data

(60) Provisional application No. 63/038,389, filed on Jun. 12, 2020.

(51) Int. Cl.
*H04N 19/33*     (2014.01)
*H04N 19/23*     (2014.01)

(52) U.S. Cl.
CPC ............. *H04N 19/33* (2014.11); *H04N 19/23* (2014.11)

(58) Field of Classification Search
CPC ...... G06T 9/001; H04N 19/597; H04N 19/70; H04N 19/184; H04N 19/423
See application file for complete search history.

(56) References Cited

U.S. PATENT DOCUMENTS

| | | | | |
|---|---|---|---|---|
| 9,936,196 B2 * | 4/2018 | Chen | ...................... | H04N 19/70 |
| 11,589,052 B2 * | 2/2023 | Choi | ...................... | H04N 19/46 |

(Continued)

FOREIGN PATENT DOCUMENTS

WO     WO-2020008758 A1     1/2020

OTHER PUBLICATIONS

International Search Report and Written Opinion mailed on Aug. 3, 2021, received for PCT Application PCT/JP2021/020355, filed on May 28, 2021, 9 pages including English Translation.

(Continued)

*Primary Examiner* — Fabio S Lima
(74) *Attorney, Agent, or Firm* — XSENSUS LLP

(57)     ABSTRACT

The present disclosure relates to an information processing device and a method capable of more easily reproducing 3D data using spatial scalability.

2D data obtained by two-dimensionally converting a point cloud representing an object having a three-dimensional shape as a set of points and corresponding to spatial scalability is encoded, a bitstream including a sub-bitstream obtained by encoding the point cloud corresponding to a single or plurality of layers of the spatial scalability is generated, spatial scalability information regarding the spatial scalability of the sub-bitstream is generated, and a file that stores the bitstream generated and the spatial scalability information generated is generated. The present disclosure can be applied to, for example, an information processing device, an information processing method, or the like.

5 Claims, 29 Drawing Sheets

(56) References Cited

U.S. PATENT DOCUMENTS

| | | | |
|---|---|---|---|
| 2013/0128990 A1* | 5/2013 | Narasimhan | H04N 19/423 |
| | | | 375/240.25 |
| 2015/0195578 A1* | 7/2015 | Chen | H04N 21/2401 |
| | | | 375/240.26 |
| 2015/0264373 A1* | 9/2015 | Wang | H04N 19/44 |
| | | | 375/240.25 |
| 2017/0019673 A1* | 1/2017 | Tsukuba | H04N 19/30 |
| 2018/0268570 A1 | 9/2018 | Budagavi et al. | |
| 2018/0359507 A1* | 12/2018 | Oh | H04N 21/2362 |
| 2019/0058895 A1* | 2/2019 | Deshpande | H04N 21/8451 |
| 2019/0087978 A1 | 3/2019 | Tourapis et al. | |
| 2021/0392332 A1* | 12/2021 | Choi | H04N 19/30 |
| 2022/0141488 A1* | 5/2022 | He | H04N 19/172 |
| | | | 375/240.12 |
| 2022/0217330 A1* | 7/2022 | Wang | H04N 19/46 |
| 2022/0351421 A1* | 11/2022 | Oh | G06T 9/40 |
| 2023/0063674 A1* | 3/2023 | Wang | H04N 19/176 |
| 2023/0119708 A1* | 4/2023 | Deng | H04N 19/46 |
| 2023/0188751 A1* | 6/2023 | Hamza | H04N 19/119 |
| | | | 375/240.12 |
| 2023/0199202 A1* | 6/2023 | Sánchez De La Fuente | |
| | | | H04N 19/30 |
| | | | 375/240.16 |
| 2023/0224479 A1* | 7/2023 | Sánchez De La Fuente | |
| | | | H04N 19/70 |
| | | | 375/240.02 |
| 2023/0239511 A1* | 7/2023 | Wang | H04N 19/187 |
| | | | 375/240.26 |

OTHER PUBLICATIONS

"Information technology—Coding of audio-visual objects—Part 12: ISO base media file format", ISO/IEC 14496-12:2015(E), Feb. 20, 2015, pp. 1-258.

"Information technology—Coding of audio-visual objects—Part 15: Carriage of network abstraction layer (NAL) unit structured video in the ISO base media file format", ISO/IEC FDIS 14496-15:2014(E), ISO/IEC JTC 1/SC 29/WG 11, Jan. 13, 2014, pp. 1-170.

Im et al., "A method of level of details control table for 3D point density scalability in video based point cloud compression", Proceedings of SPIE, vol. 11137, Applications of Digital Image Processing XLII, 111371A, 6 Sep. 6, 2019, pp. 111371A-1-111371A-6.

3DG Group, "Report on Scalability features in V-PCC", ISO/IEC JTC 1/SC 29/WG 11 N19156, Jan. 2020, 15 pages.

"Information technology—Coded representation of immersive media—Part 10: Carriage of Visual Volumetric Video-based Coding Data", ISO 23090-10:2020(E), ISO/IEC JTC1/SC 29/WG 11, 2020, pp. 1-53.

Sevom et al., "Geometry-Guided 3D Date Interpolation for Projection-Based Dynamic Point Cloud Coding", 7th European Workshop on Visual Information Processing (EUVIP), Nov. 26-28, 2018, 6 pages.

"Information technology—Coded Representation of Immersive Media—Part 5: Visual Volumetric Video-based Coding (V3C) and Video-based Point Cloud Compression (V-PCC)", ISO/IEC 23090-5:2019(E), ISO/IEC JTC 1/SC 29/ WG 11, 2019, pp. 1-232.

* cited by examiner

Figure 7:
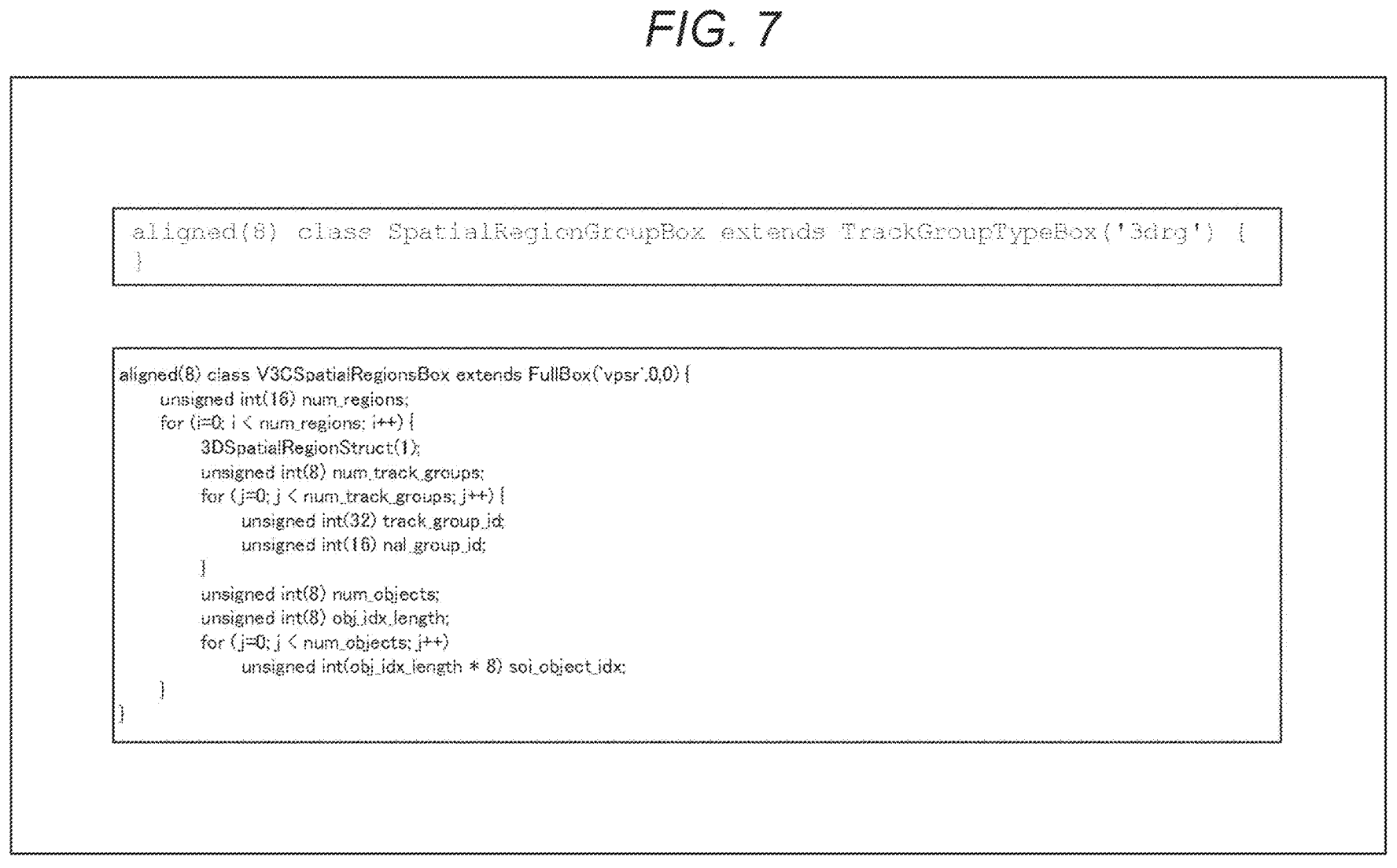

```
aligned(8) class SpatialRegionGroupBox extends TrackGroupTypeBox('3drg') {
}
```

```
aligned(8) class V3CSpatialRegionsBox extends FullBox('vpsr',0,0) {
    unsigned int(16) num_regions;
    for (i=0; i < num_regions; i++) {
        3DSpatialRegionStruct(1);
        unsigned int(8) num_track_groups;
        for (j=0; j < num_track_groups; j++) {
            unsigned int(32) track_group_id;
            unsigned int(16) nal_group_id;
        }
        unsigned int(8) num_objects;
        unsigned int(8) obj_idx_length;
        for (j=0; j < num_objects; j++)
            unsigned int(obj_idx_length * 8) soi_object_idx;
    }
}
```

FIG. 10

| | Descriptor |
|---|---|
| patch_data_unit( patchIdx ) { | |
| pdu_2d_pos_x[ patchIdx ] | ue(v) |
| pdu_2d_pos_y[ patchIdx ] | ue(v) |
| pdu_2d_size_x_minus1[ patchIdx ] | ue(v) |
| pdu_2d_size_y_minus1[ patchIdx ] | ue(v) |
| pdu_3d_pos_x[ patchIdx ] | u(v) |
| pdu_3d_pos_y[ patchIdx ] | u(v) |
| pdu_3d_pos_min_z[ patchIdx ] | u(v) |
| if( asps_normal_axis_max_delta_value_enabled_flag ) | |
|     pdu_3d_pos_delta_max_z[ patchIdx ] | u(v) |
| pdu_projection_id[ patchIdx ] | u(v) |
| pdu_orientation_index[ patchIdx ] | u(v) |
| if( afps_lod_mode_enabled_flag ) { | |
|     pdu_lod_enabled_flag[ patchIndex ] | u(1) |
|     if( pdu_lod_enabled_flag[ patchIndex ] > 0 ) { | |
|        pdu_lod_scale_x_minus1[ patchIndex ] | ue(v) |
|        pdu_lod_scale_y[ patchIndex ] | ue(v) |
|     } | |
| } | |
| if( asps_point_local_reconstruction_enabled_flag ) | |
|     point_local_reconstruction_data( patchIdx ) | u(v) |
| } | |

```
aligned(8) class VPCCSpatialRegionsBox extends
FullBox( 'vpsr' ,0,0) {
    unsigned int(16) num_regions;
    for (i=0; i < num_regions; i++) {
        3DSpatialRegionStruct(1);
        unsigned int(1) spatial_scalability_flag;
        bit(7) reserved = 0;
        if (spatial_scalability_flag)
            SpatialScalabilityInfoStruct();
        unsigned int(8) num_track_groups;
        for (j=0; j < num_track_groups; j++) {
            unsigned int(32) track_group_id;
            unsigned int(16) nal_group_id;
        }
        unsigned int(8) num_objects;
        unsigned int(8) obj_idx_length;
        for (j=0; j < num_objects; j++)
            unsigned int(obj_idx_length * 8) sci_object_idx;
    }
}
```

A

```
aligned(8) class SpatialScalabilityInfoStruct() {
    unsigned int(8) spatial_scalability_id;
    unsigned int(8) layer_id;
    unsigned int(8) lod;
}
```

```
aligned(8) class VPCCSpatialRegionsBox extends
FullBox( 'vpsr',0,0) {
    unsigned int(16) num_regions;
    for (j=0; i < num_regions; i++) {
        3DSpatialRegionStruct(1);
        unsigned int(1) spatial_scalability_flag;
        bit(7) reserved = 0;
        if (spatial_scalability_flag){
            for(j=0; j<num_layers; j++){
                SpatialScalabilityInfoStruct();
                unsigned int(8) num_track_groups;
                for (j=0; j < num_track_groups; j++) {
                    unsigned int(32) track_group_id;
                    unsigned int(16) nal_group_id;
                }
            }
        }
        unsigned int(8) num_objects;
        unsigned int(8) obj_idx_length;
        for (j=0; j < num_objects; j++)
            unsigned int(obj_idx_length * 8) soi_object_idx;
    }
}
```

A

```
aligned(8) class SpatialScalabilityInfoStruct() {
    unsigned int(8) layer_id;
    unsigned int(8) lod;
}
```

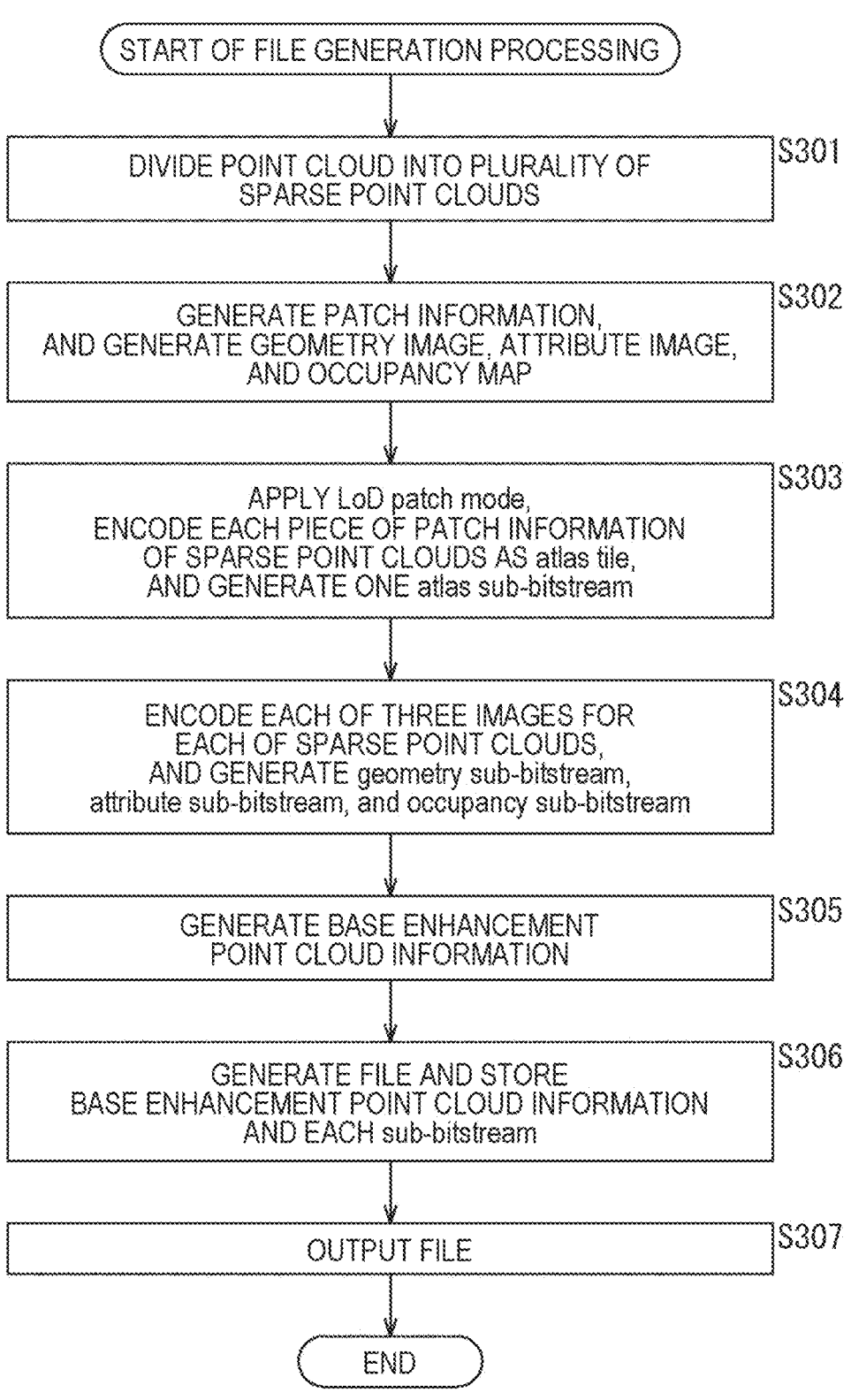

START OF FILE GENERATION PROCESSING

DIVIDE POINT CLOUD INTO PLURALITY OF
SPARSE POINT CLOUDS — S301

GENERATE PATCH INFORMATION,
AND GENERATE GEOMETRY IMAGE, ATTRIBUTE IMAGE,
AND OCCUPANCY MAP — S302

APPLY LoD patch mode,
ENCODE EACH PIECE OF PATCH INFORMATION
OF SPARSE POINT CLOUDS AS atlas tile,
AND GENERATE ONE atlas sub-bitstream — S303

ENCODE EACH OF THREE IMAGES FOR
EACH OF SPARSE POINT CLOUDS,
AND GENERATE geometry sub-bitstream,
attribute sub-bitstream, and occupancy sub-bitstream — S304

GENERATE BASE ENHANCEMENT
POINT CLOUD INFORMATION — S305

GENERATE FILE AND STORE
BASE ENHANCEMENT POINT CLOUD INFORMATION
AND EACH sub-bitstream — S306

OUTPUT FILE — S307

END

FIG. 21

| Elements and attributes for V3C3DRegions descriptor | Use | Data type | Description |
|---|---|---|---|
| vpsr | 0..1 | v3c:spatialRegionMapType | Container element whose attributes and elements specify a mapping between a 3D spatial region and V3C tiles. |
| vpsr.spatialRegion | 1..N | v3c:spatialRegionType | An element whose attributes define a 3D spatial region and provide a mapping between the defined region and a number of V3C tiles. |
| vpsr.spatialRegion.cuboid | CM | v3c:spatialRegionCuboidType | An element specifying a cuboid extending from the reference point of the spatial region. This element shall be present only when the spatialRegion@type attribute is set to 0. |
| vpsr.spatialRegion.spatialScalabilityInfo | O | v3c:spatialScalabilityInfoType | element HAVING Spatial scalability INFORMATION |
| vpsr.spatialRegion.spatialScalabilityInfo@id | M | xs:int | GROUP OF spatialRegion HAVING SAME id PROVIDES spatial scalability. |
| vpsr.spatialRegion.spatialScalabilityInfo@layer_id | M | xs:int | 0:base layer, 1 TO 255:enhancement layer_id |
| vpsr.spatialRegion.spatialScalabilityInfo@... | M | xs:int | IF layer_id = 0, THIS INFORMATION INDICATES LOD VALUE OF base layer. IF layer_id ≠ 0, THIS INFORMATION INDICATES LOD VALUE OBTAINED BY BEING SIMULTANEOUSLY DISPLAYED WITH point clouds OF OTC (layer_id = 0). NO VALUE MAY BE REFERENCE VALUE DETERMINED BY CONTENT CREATOR |
| vpsr.spatialRegion@as_ids | CM | StringVectorType | A list of space separated identifiers corresponding to the values of the @id attribute for AdaptationSets and/or Representations mapped to this region. This attribute shall be absent in the case of single-track encapsulation of the V3C content. |
| vpsr.spatialRegion@track_group_ids | O | StringVectorType | A list of space separated identifiers corresponding to the values of the track_group_id for a number of V3C component track groups. This attribute shall be absent if V3C components are stored as a single-track. |

Legend:

For attributes: M=Mandatory, O=Optional, OD=Optional with Default Value, CM=Conditionally Mandatory. For elements: <minOccurs>..<maxOccurs> (N=unbounded)

Elements are bold; attributes are non-bold and preceded with an @.

FIG. 22

| Elements and attributes for V3C3DRegions descriptor | Use | Data type | Description |
|---|---|---|---|
| vpsr | 0..1 | v3c:spatialRegionMapType | Container element whose attributes and elements specify a mapping between a 3D spatial region and V3C tiles. |
| vpsr.spatialRegion | 1..N | v3c:spatialRegionType | An element whose attributes define a 3D spatial region and provide a mapping between the defined region and a number of V3C tiles. |
| vspr.spatialRegion.cuboid | CM | v3c:spatialRegionCuboidType | An element specifying a cuboid extending from the reference point of the spatial region. This element shall be present only when the spatialRegion@type attribute is set to 0. |
| vpsr.spatialRegion.spatialScalabilityInfo | 0..N | v3c:spatialScalabilityInfoType | element HAVING Spatial scalability INFORMATION. |
| vpsr.spatialRegion@spatialScalabilityInfo@layerId | M | xs:int | 0: base layer; 1TO 255: enhancement layerid |
| vpsr.spatialRegion@spatialScalabilityInfo@location | M | xs:int | IF layerid = 0 THIS INFORMATION INDICATES 60 VALUE OF baselayer, IF layerid# 0 IF THIS INFORMATION INDICATES 60 VALUE OBTAINED BY BEING SIMULTAEOUSLY DISPLAYED WITH portidous OF 0 TO (layerid-1) 60 VALUE MAYBE REFERENCE VALUE DETERMINED BY CONTENT CREATOR. |
| vpsr.spatialRegion@spatialScalabilityInfo@asids | M | StringVectorType | Adaptation SetIds CORRESPONDINGTOLayer |
| vpsr.spatialRegion@asIds | CM | StringVectorType | A list of space separated identifiers corresponding to the values of the @id attribute for AdaptationSets and/or Representations mapped to this region. This attribute shall be absent in the case of single-track encapsulation of the V3C content. |
| vspr.spatialRegion@trackGroupIds | O | StringVectorType | A list of space separated identifiers corresponding to the values of the track_group_id for a number of V3C component track groups. This attribute shall be absent if V3C components are stored as a single-track. |

Legend:

For attributes: M=Mandatory, O=Optional, OD=Optional with Default Value, CM=Conditionally Mandatory For elements: <minOccurs>.. <maxOccurs> (N=unbounded)
Elements are non-bold; attributes are non-bold and preceded with an @.

FIG. 23

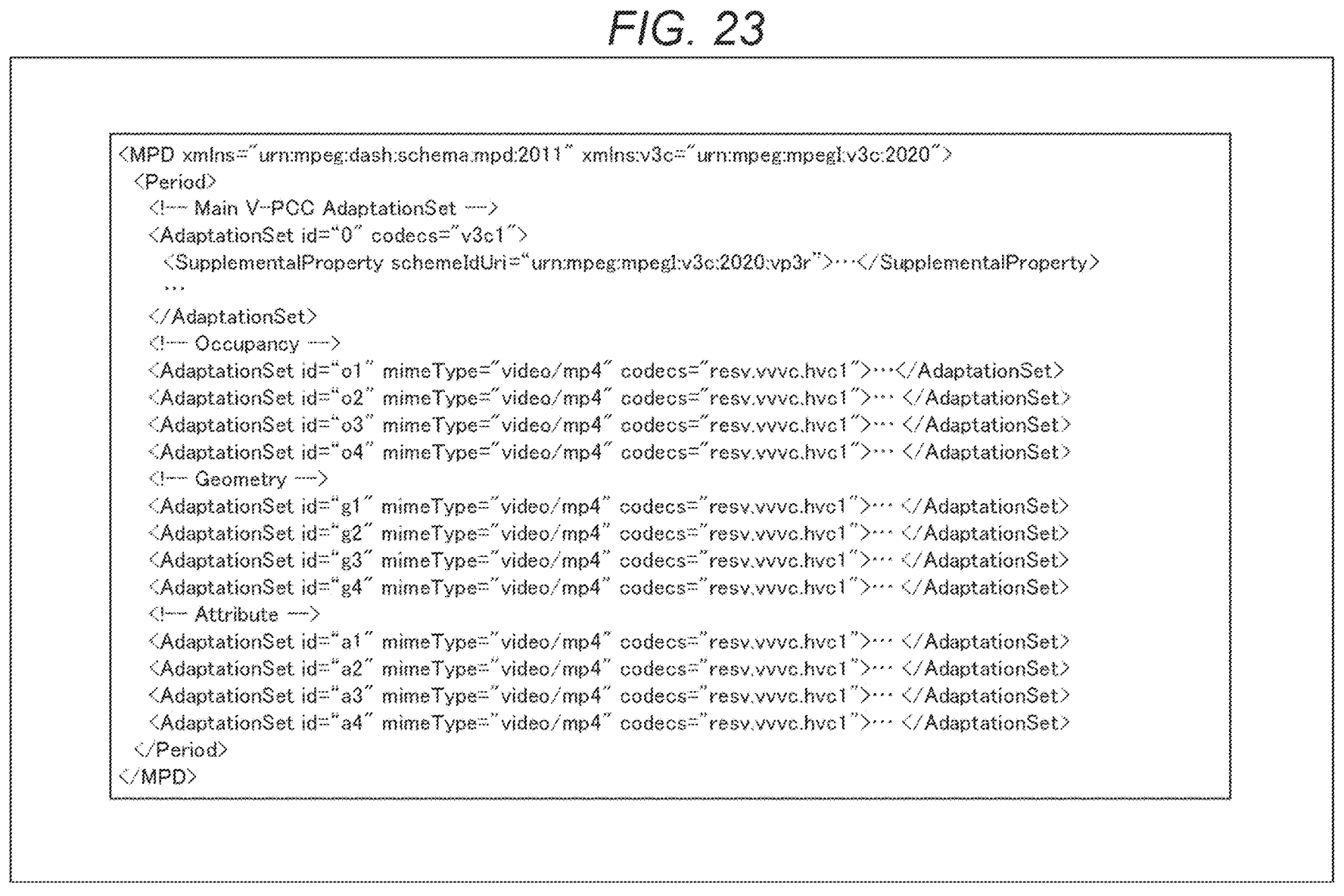

```
<MPD xmlns="urn:mpeg:dash:schema:mpd:2011" xmlns:v3c="urn:mpeg:mpeg:v3c:2020">
<Period>
<!-- Main V-PCC AdaptationSet -->
<AdaptationSet id="0" codecs="v3c1">
<SupplementalProperty schemeIdUri="urn:mpeg:mpeg:v3c:2020:vp3r">...</SupplementalProperty>
...
</AdaptationSet>
<!-- Occupancy -->
<AdaptationSet id="o1" mimeType="video/mp4" codecs="resv.vvvc.hvc1">...</AdaptationSet>
<AdaptationSet id="o2" mimeType="video/mp4" codecs="resv.vvvc.hvc1">...</AdaptationSet>
<AdaptationSet id="o3" mimeType="video/mp4" codecs="resv.vvvc.hvc1">...</AdaptationSet>
<AdaptationSet id="o4" mimeType="video/mp4" codecs="resv.vvvc.hvc1">...</AdaptationSet>
<!-- Geometry -->
<AdaptationSet id="g1" mimeType="video/mp4" codecs="resv.vvvc.hvc1">...</AdaptationSet>
<AdaptationSet id="g2" mimeType="video/mp4" codecs="resv.vvvc.hvc1">...</AdaptationSet>
<AdaptationSet id="g3" mimeType="video/mp4" codecs="resv.vvvc.hvc1">...</AdaptationSet>
<AdaptationSet id="g4" mimeType="video/mp4" codecs="resv.vvvc.hvc1">...</AdaptationSet>
<!-- Attribute -->
<AdaptationSet id="a1" mimeType="video/mp4" codecs="resv.vvvc.hvc1">...</AdaptationSet>
<AdaptationSet id="a2" mimeType="video/mp4" codecs="resv.vvvc.hvc1">...</AdaptationSet>
<AdaptationSet id="a3" mimeType="video/mp4" codecs="resv.vvvc.hvc1">...</AdaptationSet>
<AdaptationSet id="a4" mimeType="video/mp4" codecs="resv.vvvc.hvc1">...</AdaptationSet>
</Period>
</MPD>
```

*FIG. 24*

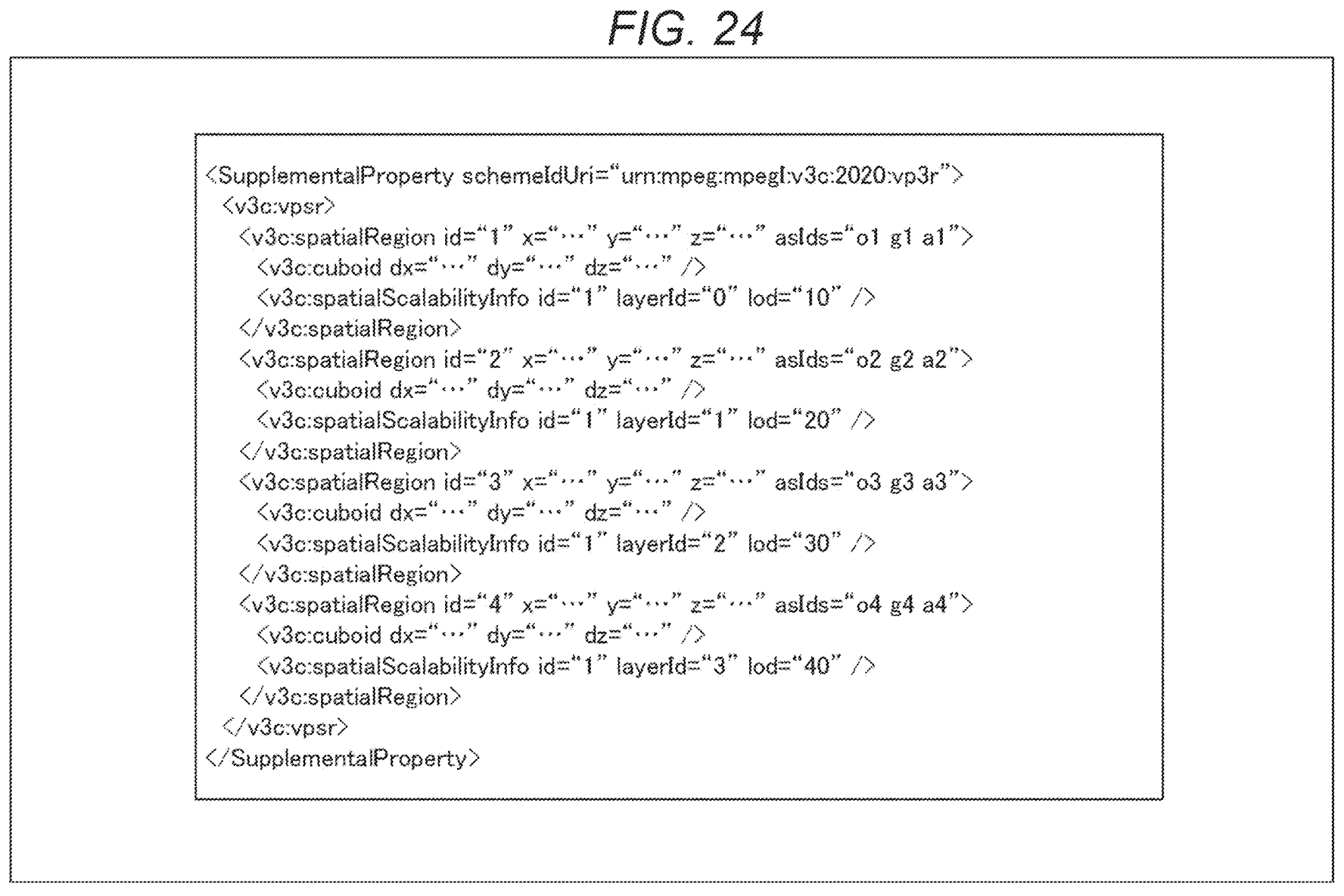

```
<SupplementalProperty schemeIdUri="urn:mpeg:mpegI:v3c:2020:vp3r">
  <v3c:vpsr>
    <v3c:spatialRegion id="1" x="..." y="..." z="..." asIds="o1 g1 a1">
      <v3c:cuboid dx="..." dy="..." dz="..." />
      <v3c:spatialScalabilityInfo id="1" layerId="0" lod="10" />
    </v3c:spatialRegion>
    <v3c:spatialRegion id="2" x="..." y="..." z="..." asIds="o2 g2 a2">
      <v3c:cuboid dx="..." dy="..." dz="..." />
      <v3c:spatialScalabilityInfo id="1" layerId="1" lod="20" />
    </v3c:spatialRegion>
    <v3c:spatialRegion id="3" x="..." y="..." z="..." asIds="o3 g3 a3">
      <v3c:cuboid dx="..." dy="..." dz="..." />
      <v3c:spatialScalabilityInfo id="1" layerId="2" lod="30" />
    </v3c:spatialRegion>
    <v3c:spatialRegion id="4" x="..." y="..." z="..." asIds="o4 g4 a4">
      <v3c:cuboid dx="..." dy="..." dz="..." />
      <v3c:spatialScalabilityInfo id="1" layerId="3" lod="40" />
    </v3c:spatialRegion>
  </v3c:vpsr>
</SupplementalProperty>
```

*FIG. 29*

INFORMATION PROCESSING DEVICE AND METHOD

CROSS-REFERENCE TO RELATED APPLICATIONS

The present application is based on PCT filing PCT/JP2021/020355, filed May 28, 2021, which claims priority to U.S. Provisional Application No. 63/038,389 filed Jun. 12, 2020, the entire contents of each are incorporated herein by reference.

TECHNICAL FIELD

The present disclosure relates to an information processing device and a method, and more particularly relates to an information processing device and a method capable of reproducing 3D data more easily using spatial scalability.

BACKGROUND ART

Conventionally, encoding and decoding of a point cloud representing an object having a three-dimensional shape as a set of points has been standardized by the Moving Picture Experts Group (MPEG). Then, a method (hereinafter, also referred to as video based point cloud compression (V-PCC)) has been proposed in which a geometry and an attribute of the point cloud are projected on a two-dimensional plane for each small area, an image (patch) projected on the two-dimensional plane is arranged in a frame image of a moving image, and the moving image is encoded by an encoding method for a two-dimensional image (see, for example, Non Patent Document 1).

Furthermore, there is International Organization for Standardization Base Media File Format (ISOBMFF) which is a file container specification of an international standard technique, Moving Picture Experts Group-4 (MPEG-4) for moving image compression (see, for example, Non Patent Document 2 and Non Patent Document 3).

Then, for the purpose of improving the efficiency of reproduction processing and network distribution of a bitstream (also referred to as a V3C bitstream) encoded by V-PCC from a local storage, a method of storing the V3C bitstream in ISOBMFF has been studied (see, for example, Non Patent Document 4). Furthermore, Non Patent Document 4 discloses a partial access technique for decoding only a part of a point cloud object.

Moreover, in MPEG-I Part 5: Visual Volumetric Video-based Coding (V3C) and Video-based Point Cloud Compression (V-PCC), an LoD patch mode has been proposed for performing encoding so that a client can independently decode a low LoD (sparse) point cloud constituting a high LoD (dense) point cloud, and construct the low LoD point cloud (see, for example, Non Patent Document 5).

CITATION LIST

Non Patent Document

Non Patent Document 1: "V-PCC Future Enhancements (V3C+V-PCC)", ISO/IEC JTC 1/SC 29/WG 11 N19329, 2020-04-24

Non Patent Document 2: "Information technology—Coding of audio-visual objects—Part 12: ISO base media file format", ISO/IEC 14496-12, 2015-02-20

Non Patent Document 3: "Information technology—Coding of audio-visual objects—Part 15: Carriage of network abstraction layer (NAL) unit structured video in the ISO base media file format", ISO/IEC FDIS 14496-15:2014 (E), ISO/IEC JTC 1/SC 29/WG 11, 2014-01-13

Non Patent Document 4: "Text of ISO/IEC DIS 23090-10 Carriage of Visual Volumetric Video-based Coding Data", ISO/IEC JTC 1/SC 29/WG 11 N19285, 2020-06-01

Non Patent Document 5: "Report on Scalability features in V-PCC", ISO/IEC JTC 1/SC 29/WG 11 N19156, 2020-01-22

SUMMARY OF THE INVENTION

Problems to be Solved by the Invention

However, ISOBMFF that stores the V3C bitstream described in Non Patent Document 4 does not support this spatial scalability, and it has been difficult to store information regarding the spatial scalability in the system layer. Thus, in order for the client to construct 3D data with a desired LoD using this spatial scalability, complicated work such as analyzing the V3C bitstream has been required.

The present disclosure has been made in view of such a situation, and an object thereof is to enable 3D data to be reproduced more easily using spatial scalability.

Solutions to Problems

An information processing device according to one aspect of the present technology is an information processing device including an encoding unit that encodes two-dimensional (2D) data obtained by two-dimensionally converting a point cloud representing an object having a three-dimensional shape as a set of points and corresponding to spatial scalability, and generates a bitstream including a sub-bitstream obtained by encoding the point cloud corresponding to a single or plurality of layers of the spatial scalability, a spatial scalability information generation unit that generates spatial scalability information regarding the spatial scalability of the sub-bitstream, and a file generation unit that generates a file that stores the bitstream generated by the encoding unit and the spatial scalability information generated by the spatial scalability information generation unit.

An information processing method according to one aspect of the present technology is an information processing method including encoding 2D data obtained by two-dimensionally converting a point cloud representing an object having a three-dimensional shape as a set of points and corresponding to spatial scalability, and generating a bitstream including a sub-bitstream obtained by encoding the point cloud corresponding to a single or plurality of layers of the spatial scalability, generating spatial scalability information regarding the spatial scalability of the sub-bitstream, and generating a file that stores the bitstream generated and the spatial scalability information generated.

An information processing device according to another aspect of the present technology is an information processing device including a selection unit that selects a layer of spatial scalability to be decoded on the basis of spatial scalability information stored in a file and regarding the spatial scalability of a bitstream obtained by encoding 2D data obtained by two-dimensionally converting a point cloud representing an object having a three-dimensional shape as a set of points and corresponding to the spatial scalability, an extraction unit that extracts a sub-bitstream corresponding to the layer selected by the selection unit from the bitstream stored in the file, and a decoding unit that decodes the sub-bitstream extracted by the extraction unit.

An information processing method according to another aspect of the present technology is an information processing method including selecting a layer of spatial scalability to be decoded on the basis of spatial scalability information stored in a file and regarding the spatial scalability of a bitstream obtained by encoding 2D data obtained by two-dimensionally converting a point cloud representing an object having a three-dimensional shape as a set of points and corresponding to the spatial scalability, extracting a sub-bitstream corresponding to the selected layer from the bitstream stored in the file, and decoding the extracted sub-bitstream.

An information processing device according to still another aspect of the present technology is an information processing device including an encoding unit that encodes 2D data obtained by two-dimensionally converting a point cloud representing an object having a three-dimensional shape as a set of points and corresponding to spatial scalability, and generates a bitstream including a sub-bitstream obtained by encoding the point cloud corresponding to a single or plurality of layers of the spatial scalability, a spatial scalability information generation unit that generates spatial scalability information regarding the spatial scalability of the sub-bitstream, and a control file generation unit that generates a control file that stores the spatial scalability information generated by the spatial scalability information generation unit and control information regarding distribution of the bitstream generated by the encoding unit.

An information processing method according to still another aspect of the present technology is an information processing method including encoding 2D data obtained by two-dimensionally converting a point cloud representing an object having a three-dimensional shape as a set of points and corresponding to spatial scalability, and generating a bitstream including a sub-bitstream obtained by encoding the point cloud corresponding to a single or plurality of layers of the spatial scalability, generating spatial scalability information regarding the spatial scalability of the sub-bitstream, and generating a control file that stores the spatial scalability information generated and control information regarding distribution of the bitstream generated.

An information processing device according to still another aspect of the present technology is an information processing device including a selection unit that selects a layer of spatial scalability to be decoded on the basis of spatial scalability information stored in a control file storing control information regarding distribution of a bitstream, the spatial scalability information regarding the spatial scalability of the bitstream obtained by encoding 2D data obtained by two-dimensionally converting a point cloud representing an object having a three-dimensional shape as a set of points and corresponding to the spatial scalability, an acquisition unit that acquires a sub-bitstream corresponding to the layer selected by the selection unit, and a decoding unit that decodes the sub-bitstream acquired by the acquisition unit.

An information processing method according to still another aspect of the present technology is an information processing method including selecting a layer of spatial scalability to be decoded on the basis of spatial scalability information stored in a control file storing control information regarding distribution of a bitstream, the spatial scalability information regarding the spatial scalability of the bitstream obtained by encoding 2D data obtained by two-dimensionally converting a point cloud representing an object having a three-dimensional shape as a set of points and corresponding to the spatial scalability, acquiring a sub-bitstream corresponding to the layer selected, and decoding the sub-bitstream acquired.

In the information processing device and method according to one aspect of the present technology, 2D data obtained by two-dimensionally converting a point cloud representing an object having a three-dimensional shape as a set of points and corresponding to spatial scalability is encoded, and a bitstream including a sub-bitstream obtained by encoding the point cloud corresponding to a single or plurality of layers of the spatial scalability is generated, spatial scalability information regarding the spatial scalability of the sub-bitstream is generated, and a file that stores the bitstream generated and the spatial scalability information generated is generated.

In the information processing device and method according to another aspect of the present technology, a layer of spatial scalability to be decoded is selected on the basis of spatial scalability information stored in a file and regarding the spatial scalability of a bitstream obtained by encoding 2D data obtained by two-dimensionally converting a point cloud representing an object having a three-dimensional shape as a set of points and corresponding to the spatial scalability, a sub-bitstream corresponding to the selected layer is extracted from the bitstream stored in the file, and the extracted sub-bitstream is decoded.

In the information processing device and method according to still another aspect of the present technology, 2D data obtained by two-dimensionally converting a point cloud representing an object having a three-dimensional shape as a set of points and corresponding to spatial scalability is encoded, and a bitstream including a sub-bitstream obtained by encoding the point cloud corresponding to a single or plurality of layers of the spatial scalability is generated, spatial scalability information regarding the spatial scalability of the sub-bitstream is generated, and a control file that stores the spatial scalability information generated and control information regarding distribution of the bitstream generated is generated.

In the information processing device and method according to still another aspect of the present technology, a layer of spatial scalability to be decoded is selected on the basis of spatial scalability information stored in a control file storing control information regarding distribution of a bitstream, the spatial scalability information regarding the spatial scalability of the bitstream obtained by encoding 2D data obtained by two-dimensionally converting a point cloud representing an object having a three-dimensional shape as a set of points and corresponding to the spatial scalability, a sub-bitstream corresponding to the layer selected is acquired, and the sub-bitstream acquired is decoded.

BRIEF DESCRIPTION OF DRAWINGS

FIG. 6 is a diagram illustrating an example of a file structure in a case where a 3D spatial region is static.

FIG. 7 is a diagram illustrating examples of SpatialRegionGroupBox and V3CSpatialRegionsBox.

FIG. 10 is a diagram illustrating an example of syntax regarding the spatial scalability.

FIG. 11 is a diagram illustrating a configuration example of data corresponding to the spatial scalability.

FIG. 13 is a diagram illustrating an example of syntax.

FIG. 14 is a diagram illustrating another example of syntax.

FIG. 17 is a flowchart illustrating an example of a flow of file generation processing.

FIG. 21 is a diagram illustrating an example of syntax.

FIG. 22 is a diagram illustrating another example of syntax.

FIG. 23 is a diagram illustrating a description example of the MPD.

FIG. 24 is a diagram illustrating a description example of the MPD.

FIG. 29 is a block diagram illustrating a main configuration example of a computer.

MODE FOR CARRYING OUT THE INVENTION

Hereinafter, modes for carrying out the present disclosure (hereinafter referred to as embodiments) will be described. Note that the description will be made in the following order.

1. Spatial scalability of V3C bitstream
2. First embodiment (file that stores bitstream and spatial scalability information)
3. Second embodiment (control file that stores spatial scalability information)
4. Appendix

1. Spatial Scalability of V3C Bitstream

<Documents and the Like that Support Technical Contents and Terms>

The scope disclosed in the present technology includes not only the contents described in the embodiments but also the contents described in the following non patent documents and the like known at the time of filing, the contents of other documents referred to in the following Non Patent Documents, and the like.

Non Patent Document 1: (described above)
Non Patent Document 2: (described above)

Non Patent Document 3: (described above)
Non Patent Document 4: (described above)
Non Patent Document 5: (described above)
Non Patent Document 6: https://www.matroska.org/index-.html That is, the contents described in the above-described Non Patent Documents, the contents of other documents referred to in the above-described Non Patent Documents, and the like are also grounds for determining the support requirement.

<Point Cloud>

Conventionally, there has been 3D data such as a point cloud representing a three-dimensional structure by point position information, attribute information, and the like.

For example, in a case of the point cloud, a three-dimensional structure (object having a three-dimensional shape) is expressed as a set of a large number of points. The point cloud includes position information (also referred to as geometry) and attribute information (also referred to as attribute) of each point. The attribute can include any information. For example, color information, reflectance information, normal line information, and the like of each point may be included in the attribute. As described above, the point cloud has a relatively simple data structure, and can express any three-dimensional structure with sufficient accuracy by using a sufficiently large number of points.

<Overview of V-PCC>

Figure 1:
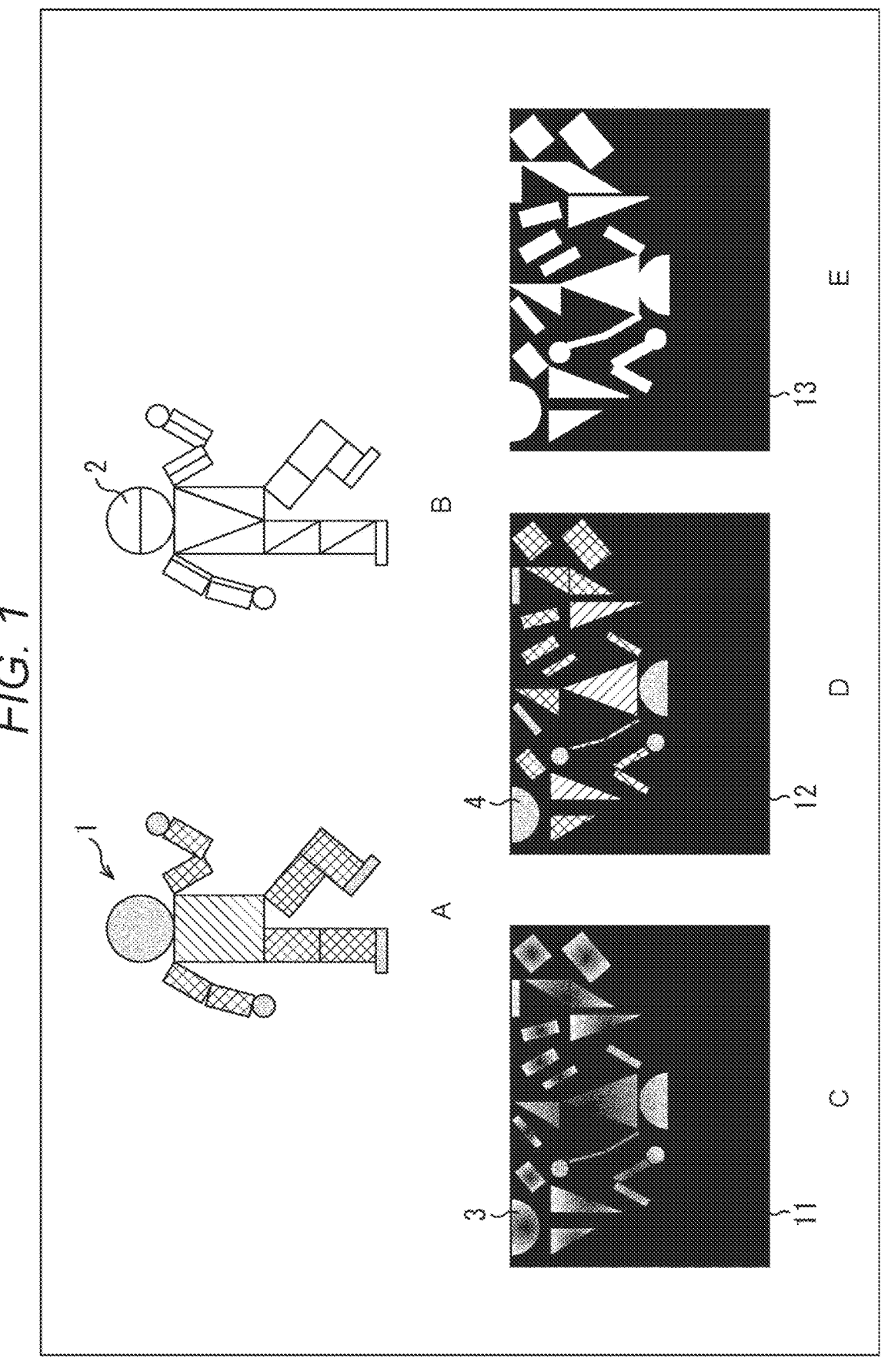
FIG. 1 is a diagram for explaining an outline of a V-PCC.

In video based point cloud compression (V-PCC), the geometry and attribute of such a point cloud are projected on a two-dimensional plane for each small area. In the present disclosure, this small area may be referred to as a partial area. An image in which the geometry and the attribute are projected on a two-dimensional plane is also referred to as a projection image. Furthermore, the projection image for each small area (partial area) is referred to as a patch. For example, an object 1 (3D data) in A of FIG. 1 is decomposed into patches 2 (2D data) as illustrated in B of FIG. 1. In a case of a geometry patch, each pixel value indicates position information of a point. However, in this case, the position information of the point is expressed as position information (depth value (Depth)) in a direction perpendicular to the projection plane (depth direction).

Then, each patch generated in this manner is arranged in a frame image (also referred to as a video frame) of a video sequence. The frame image in which the geometry patch is arranged is also referred to as a geometry video frame. Furthermore, the frame image in which the attribute patch is arranged is also referred to as an attribute video frame. For example, from the object 1 in A of FIG. 1, a geometry video frame 11 in which geometry patches 3 are arranged as illustrated in C of FIG. 1 and an attribute video frame 12 in which attribute patches 4 are arranged as illustrated in D of FIG. 1 are generated. For example, each pixel value of the geometry video frame 11 indicates the depth value described above.

Then, these video frames are encoded by, for example, an encoding method for a two-dimensional image such as advanced video coding (AVC) or high efficiency video coding (HEVC). That is, point cloud data that is 3D data representing a three-dimensional structure can be encoded using a codec for two-dimensional images.

Note that an occupancy map can also be used. The occupancy map is map information indicating the presence or absence of the projection image (patch) for every N×N pixels of the geometry video frame or the attribute video frame. For example, the occupancy map indicates an area (N×N pixels) in which a patch is present by a value "1", and indicates an area (N×N pixels) in which no patch is present by a value "0" in the geometry video frame or the attribute video frame.

Since a decoder can grasp whether or not the area is an area in which a patch exists by referring to the occupancy map, the influence of noise and the like caused by encoding and decoding can be suppressed, and the 3D data can be restored more accurately. For example, even if the depth value changes due to encoding and decoding, the decoder can ignore the depth value of the area where no patch exists by referring to the occupancy map. That is, the decoder can be prevented from performing processing as the position information of the 3D data by referring to the occupancy map.

For example, for the geometry video frame 11 and the attribute video frame 12, an occupancy map 13 as illustrated in E of FIG. 1 may be generated. In the occupancy map 13, a white portion indicates a value "1", and a black portion indicates a value "0".

Such an occupancy map may be encoded as data (video frame) separate from the geometry video frame and the attribute video frame and transmitted to the decoding side. That is, similarly to the geometry video frame and the attribute video frame, the occupancy map can also be encoded by the encoding method for a two-dimensional image such as AVC or HEVC.

Coded data (bitstream) generated by encoding the geometry video frame is also referred to as a geometry video sub-bitstream. Coded data (bitstream) generated by encoding the attribute video frame is also referred to as an attribute video sub-bitstream. Coded data (bitstream) generated by encoding the occupancy map is also referred to as an occupancy map video sub-bitstream. Note that the geometry video sub-bitstream, the attribute video sub-bitstream, and the occupancy map video sub-bitstream are referred to as video sub-bitstream in a case where it is not necessary to distinguish them from one another for explanation.

Moreover, atlas information (atlas), which is information for reconstructing a point cloud (3D data) from a patch (2D data), is encoded and transmitted to the decoding side. An encoding method (and a decoding method) of the atlas information is arbitrary. Coded data (bitstream) generated by encoding the atlas information is also referred to as an atlas sub-bitstream.

Note that, in the following description, it is assumed that (the object of) the point cloud can change in the time direction like a moving image of a two-dimensional image. That is, the geometry data and the attribute data have a concept of a time direction, and are data sampled at every predetermined time interval like a moving image of a two-dimensional image. Note that, like the video frame of a two-dimensional image, data at each sampling time is referred to as a frame. That is, the point cloud data (geometry data and attribute data) includes a plurality of frames like a moving image of a two-dimensional image. In the present disclosure, the frame of the point cloud is also referred to as a point cloud frame. In a case of the V-PCC, even such a point cloud of a moving image (a plurality of frames) can be encoded with high efficiency using a moving image encoding method by converting each point cloud frame into the video frame to form the video sequence.

<Structure of V3C Bitstream>

An encoder multiplexes the coded data of the geometry video frame, the attribute video frame, the occupancy map, and the atlas information as described above to generate one bitstream. This bitstream is also referred to as a V3C bitstream (V3C Bitstream).

Figure 2:
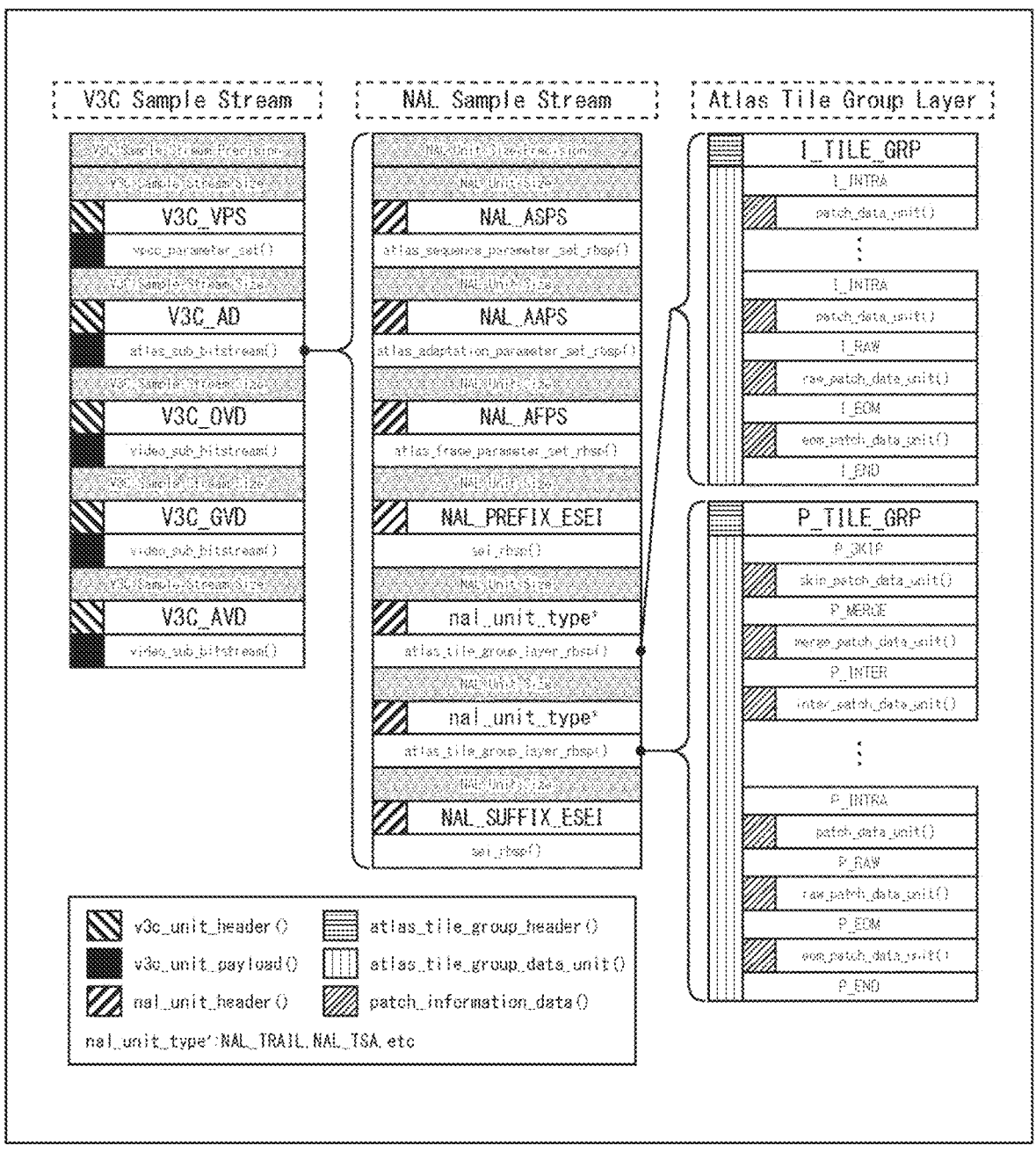
FIG. 2 is a diagram illustrating a main configuration example of a V3C bitstream.

FIG. 2 is a diagram illustrating a structural example of a V3C sample stream which is one format of the V3C bitstream. As illustrated in FIG. 2, the V3C bitstream (V3C sample stream) which is a coded stream of V-PCC includes a plurality of V3C units.

The V3C unit includes a V3C unit header (V3C unit header) and a V3C unit payload (V3C unit payload). The V3C unit header includes information indicating a type of information to be stored in the V3C unit payload. Depending on the type to be stored in the V3C unit header, the V3C unit payload may store the attribute video sub-bitstream, the geometry video sub-bitstream, an occupancy video sub-bitstream, the atlas sub-bitstream, and the like.

<Structure of Atlas Sub-Bitstream>

Figure 3:
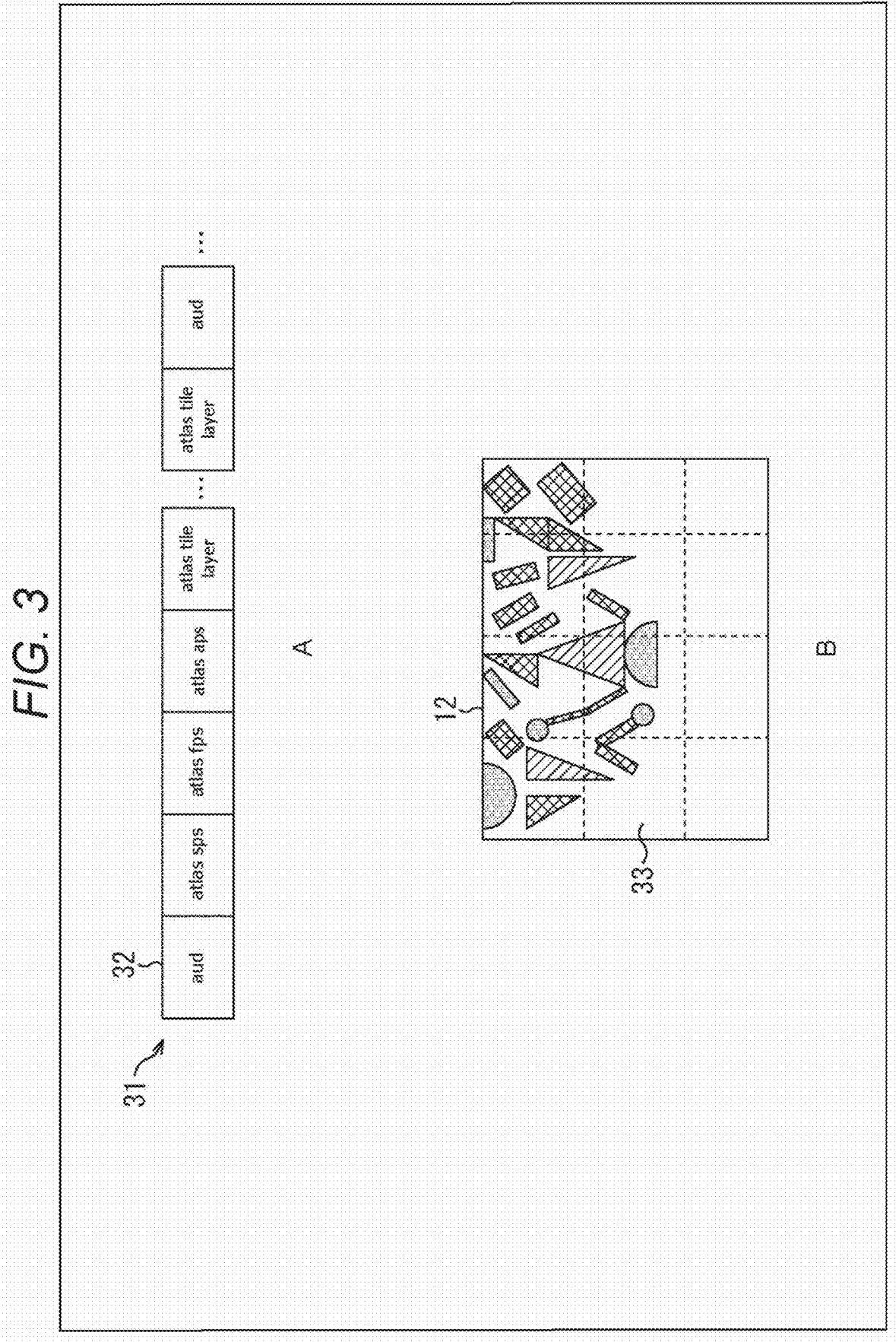
FIG. 3 is a diagram illustrating a main configuration example of an atlas sub-bitstream.

A of FIG. 3 is a diagram illustrating a main configuration example of the atlas sub-bitstream. As illustrated in A of FIG. 3, the atlas sub-bitstream 31 includes a succession of atlas NAL units 32. Each square illustrated in A of FIG. 3 illustrates an atlas NAL unit 32.

and is a NAL unit of an access unit delimiter. atlas sps is a NAL unit of an atlas sequence parameter set. atlas fps is a NAL unit of an atlas frame parameter set. atlas aps is a NAL unit of an atlas adaptation parameter set.

An atlas tile layer NAL unit is a NAL unit of the atlas tile layer. The atlas tile layer NAL unit has atlas tile information that is information regarding an atlas tile. One atlas tile layer NAL unit has information of one atlas tile. That is, the atlas tile layer NAL unit and the atlas tile have a one-to-one correspondence.

atlas fps stores in-frame position information of the atlas tile, and the position information is associated with the atlas tile layer NAL unit via an id.

The atlas tiles can be decoded independently of each other, and have 2D3D conversion information for patches of corresponding rectangular areas of a video sub-bitstream. The 2D3D conversion information is information for converting a patch that is 2D data into a point cloud that is 3D data. For example, the attribute video frame 12 illustrated in B of FIG. 3 is divided as dotted lines to form rectangular atlas tiles 33.

Encoding of the atlas tiles has constraints equivalent to tiles of HEVC. For example, it is configured not to depend on other atlas tiles of the same frame. Furthermore, atlas frames having a reference relationship have the same atlas tile partitioning as each other. Moreover, reference is made only to the atlas tile at the same position of the reference frame.

<Storage Method in ISOBMFF>

Non Patent Document 4 defines two types, multi-track structure and single track structure, as methods for storing the V3C bitstream in ISOBMFF (International Organization for Standardization Base Media File Format).

Figure 4:
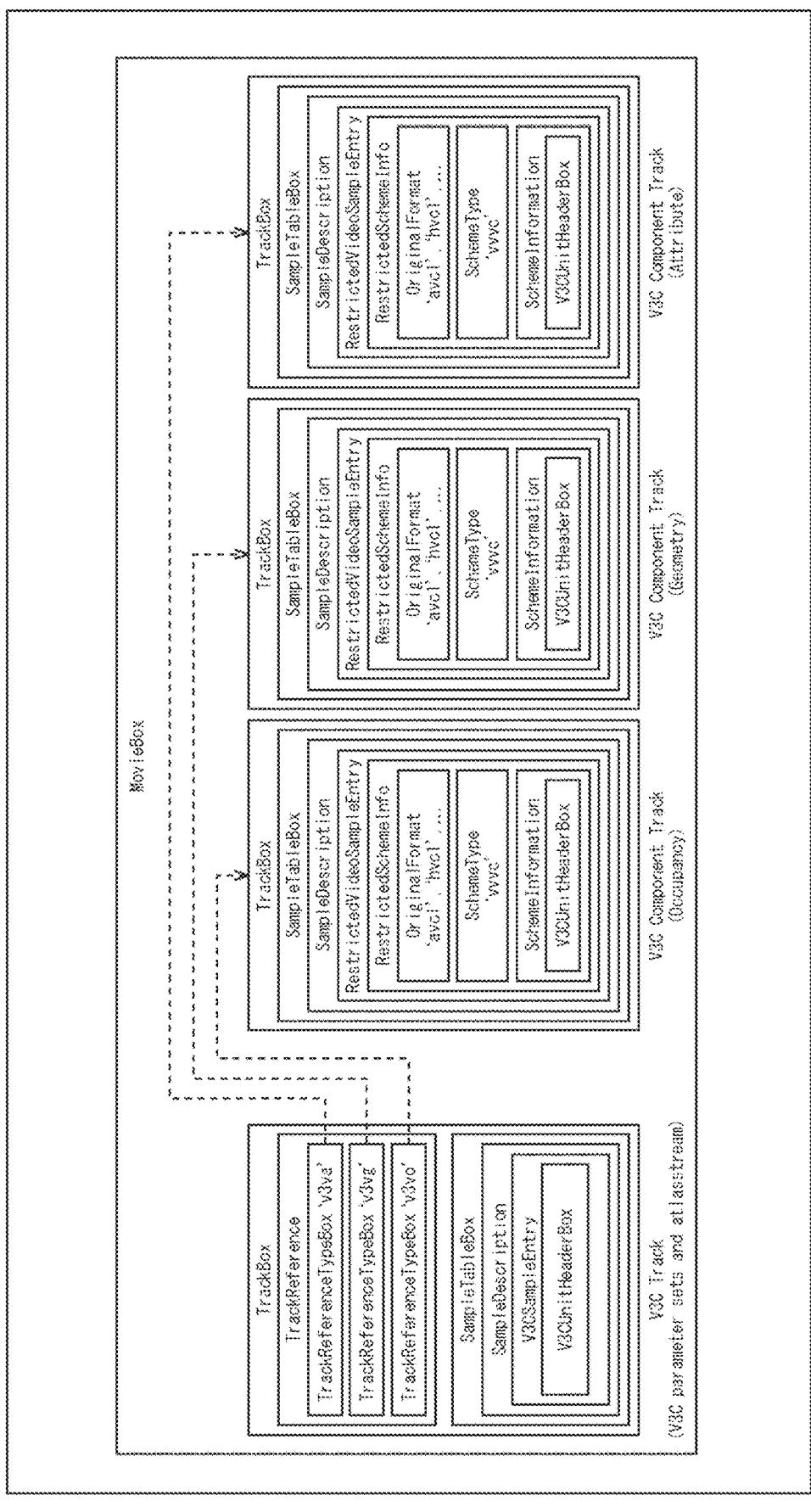
FIG. 4 is a diagram illustrating an example of a structure of ISOBMFF that stores the V3C bitstream.

The multi-track structure is a method of storing the geometry video sub-bitstream, the attribute video sub-bitstream, the occupancy video sub-bitstream, and the atlas sub-bitstream in separate tracks respectively. Since each video sub-bitstream is a conventional 2D video stream, the video sub-bitstream can be stored (managed) in a similar manner to that in a case of 2D. FIG. 4 illustrates a configuration example of a file in a case where the multi-track structure is applied.

The single track structure is a method of storing a V-PCC bitstream in one track. That is, in this case, the geometry video sub-bitstream, the attribute video sub-bitstream, the occupancy map video sub-bitstream, and the atlas sub-bitstream are stored in the same track as each other.

<Partial Access>

Incidentally, Non Patent Document 4 defines partial access information for acquiring and decoding a part of an object of a point cloud. For example, by using the partial access information, it is possible to perform control such that only the information of a display portion of the object of the point cloud is acquired at the time of streaming distribution. By such control, it is possible to obtain an effect of achieving high definition by effectively using the bandwidth.

Figure 5:
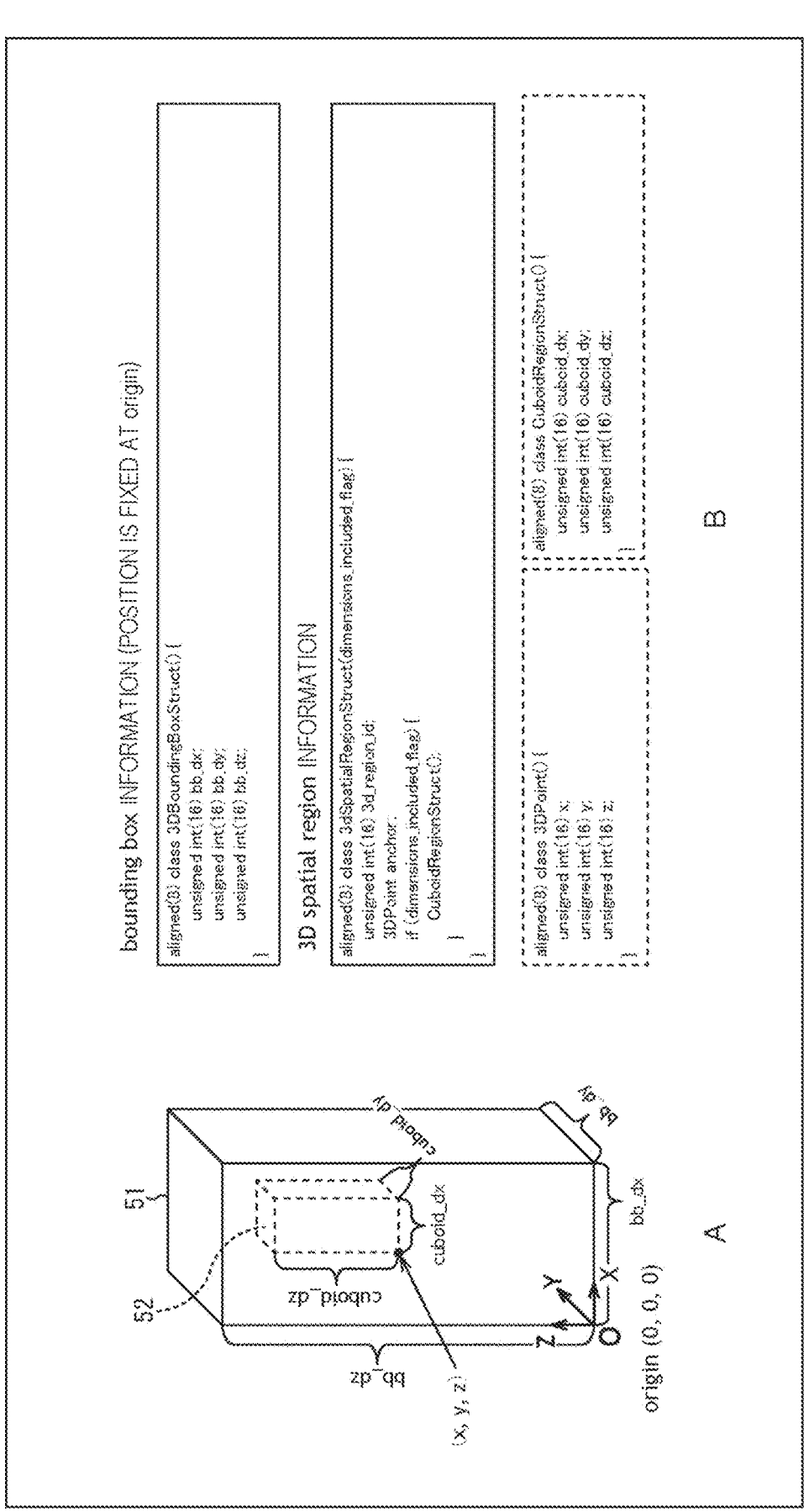
FIG. 5 is a diagram for explaining an example of partial access information.

For example, as illustrated in A of FIG. 5, it is assumed that a bounding box 51 which is a three-dimensional area including an object of a point cloud is set for the object of the point cloud. That is, in ISOBMFF, as illustrated in B of FIG. 5, bounding box information (3DBoundingBoxStruct) that is information regarding the bounding box 51 is set. In the bounding box information, coordinates of a reference point (orgin) of the bounding box 51 are (0, 0, 0), and a size of the bounding box 51 is designated by (bb_dx, bb_dy, bb_dz).

By setting the partial access information, as illustrated in A of FIG. 5, a 3D spatial region 52 which is an independently decodable partial area can be set in the bounding box 51. That is, as illustrated in B of FIG. 5, 3D spatial region information (3dSpatialRegionStruct) which is information regarding the 3D spatial region 52 is set as partial access information in ISOBMFF. In the 3D spatial region information, the area is designated by coordinates (x, y, z) and a size (cuboid_dx, cuboid_dy, cuboid_dz) of the reference point.

<Example of File Structure>

Figure 6:
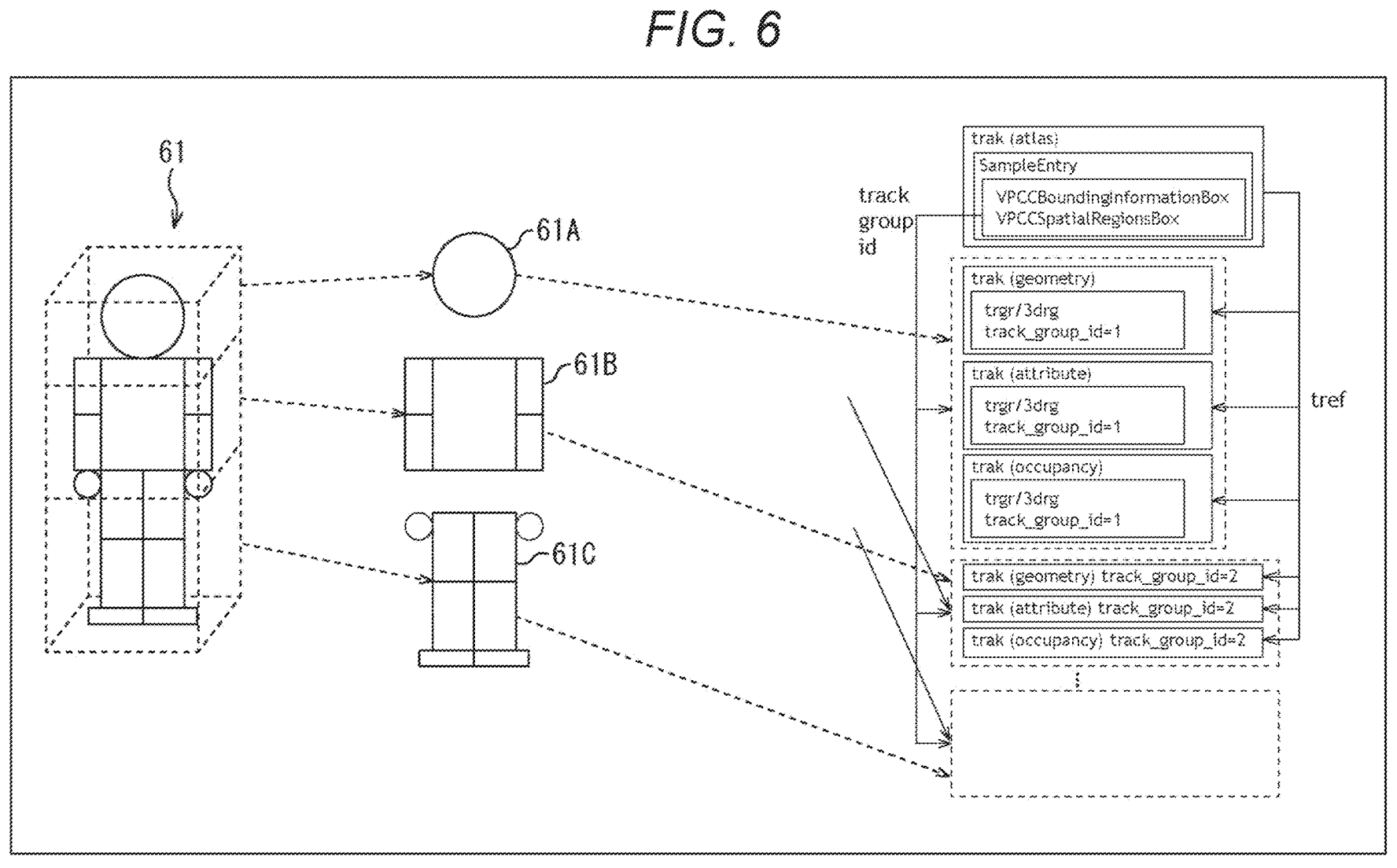

For example, it is assumed that a bitstream of the object 61 in FIG. 6 is divided into three 3D spatial regions (3D spatial region 61A, 3D spatial region 61B, and 3D spatial region 61C) and stored in ISOBMFF. Furthermore, it is assumed that the multi-track structure is applied and the 3D spatial region information is static (does not change in the time direction).

In this case, as illustrated on the right side of FIG. 6, the video sub-bitstream is stored separately for each 3D spatial region (in different tracks from each other). Then, the tracks storing the geometry video sub-bitstream, the attribute video sub-bitstream, and the occupancy video sub-bitstream corresponding to the same 3D spatial region as each other are grouped (dotted line frames in FIG. 6). This group is also referred to as a spatial region track group.

Note that the video sub-bitstream of one 3D spatial region is stored in one or a plurality of spatial region track groups. In a case of the example of FIG. 6, since three 3D spatial regions are configured, three or more spatial region track groups are formed.

A track_group_id is assigned to each spatial region track group as track group identification information that is identification information for identifying the spatial region track group. This track_group_id is stored in each track. That is, the track_group_id having the same value as each other is stored in the tracks belonging to the same spatial region track group as each other. Therefore, tracks belonging to a desired spatial region track group can be identified on the basis of the values of track_group_id.

In other words, the track_group_id having the same value as each other is stored in each of the tracks storing the geometry video sub-bitstream, the attribute video sub-bitstream, and the occupancy video sub-bitstream corresponding to the same 3D spatial region as each other. Therefore, on the basis of the value of track_group_id, each video sub-bitstream corresponding to the desired 3D spatial region can be identified.

More specifically, as illustrated in FIG. 7, spatial region group boxes (SpatialRegionGroupBox) having the same track_group_id as each other are stored in tracks belonging to the same spatial region track group as each other. The track_group_id is stored in the track group type box (TrackGroupTypeBox) inherited by the spatial region group box.

Note that the atlas sub-bitstream is stored in one V3C track regardless of the 3D spatial region. That is, this one atlas sub-bitstream has the 2D3D conversion information related to patches of a plurality of 3D spatial regions. More specifically, as illustrated in FIG. 7, a V3C spatial region box (V3CSpatialRegionsBox) is stored in the V3C track in which the atlas sub-bitstream is stored, and each track_group_id is stored in the V3C spatial region box.

The atlas tile and the spatial region track group are linked by a NALU Map Entry sample group (NALUMapEntry sample group) described in Non Patent Document 3.

Figure 8:
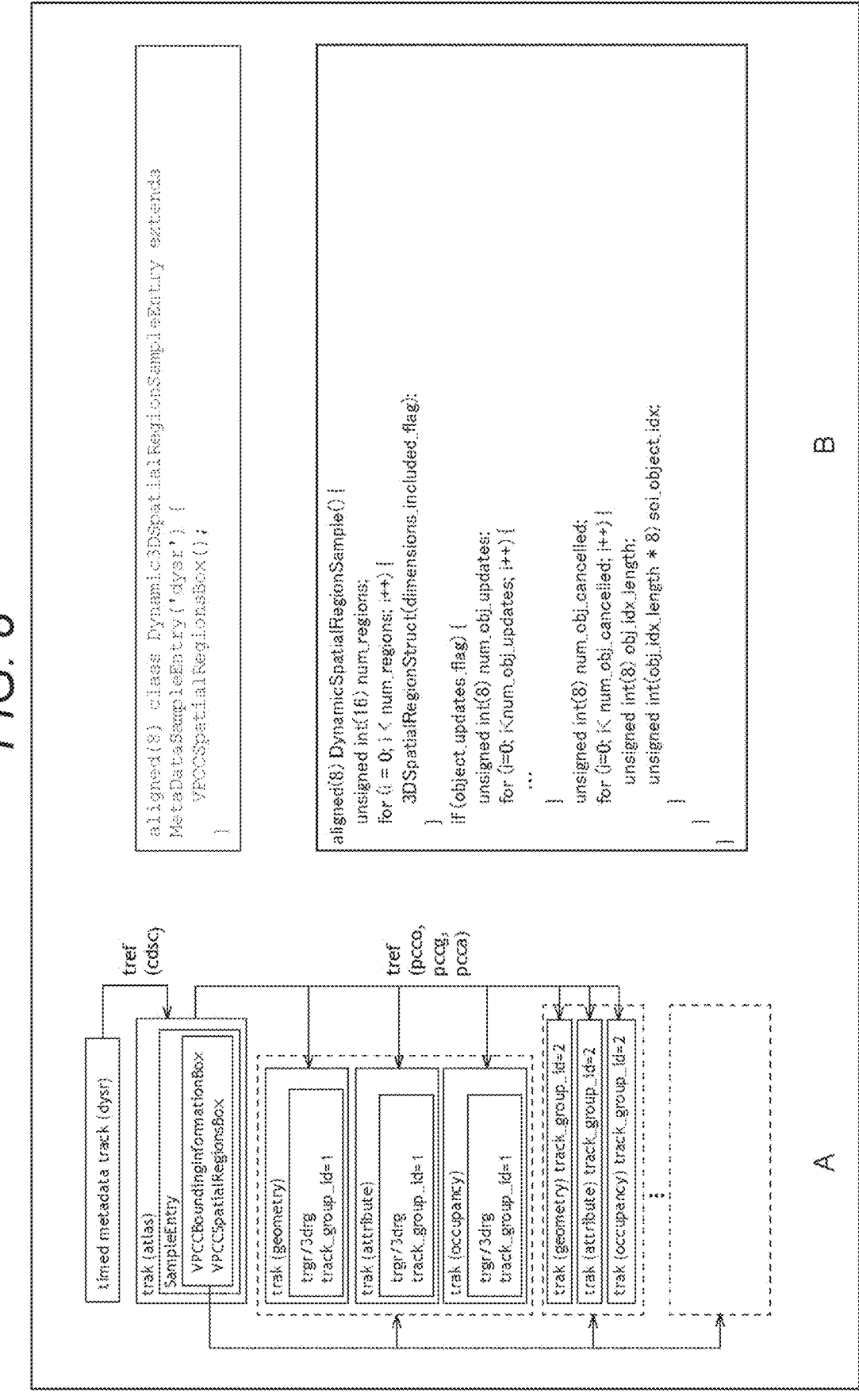
FIG. 8 is a diagram illustrating an example of a file structure in a case where the 3D spatial region dynamically changes.

Note that, in a case where the 3D spatial region information is dynamic (changes in the time direction), as illustrated in A of FIG. 8, it is sufficient if the 3D spatial region at each time is expressed using a timed metadata track. That is, as illustrated in B of FIG. 8, a dynamic 3D spatial region sample entry (Dynamic3DSpatialRegionSampleEntry) and a dynamic spatial region sample (DynamicSpatialRegionSample) are stored in ISOBMFF.

<Scalability of V-PCC Coding>

In V-PCC encoding, for example, as described above, by using a volumetric annotation SEI message family, region-based scalability capable of decoding and rendering only a partial point cloud of a specific 3D spatial position can be achieved.

Furthermore, as described in Non Patent Document 5, by using an LoD patch mode, it is possible to achieve spatial scalability capable of decoding and rendering only points of a point cloud to be a specific LoD.

The LoD indicates a hierarchy in a case where the point cloud object is hierarchized by the density of points. For example, the points in the point cloud are grouped (hierarchized) such that a plurality of hierarchies (from a hierarchy with sparse points to a hierarchy with dense points) having different densities of points from each other is formed, such as an octree using voxel quantization. Each hierarchy of such a hierarchical structure is also referred to as LoD.

The point cloud objects constructed by the LoDs represent the same object as each other, but have different resolutions (the number of points) from each other. That is, this hierarchical structure can also be said to be a hierarchical structure based on the resolution of the point cloud.

<LoD Patch Mode>

In the LoD patch mode, the point cloud is encoded so that a client can independently decode a low LoD (sparse) point cloud constituting a high LoD (dense) point cloud, and construct a low LoD point cloud.

That is, by grouping the points as described above, the point cloud (dense point cloud) of the original density is divided into a plurality of sparse point clouds. The density of these sparse point clouds may or may not be the same as each other. By using a single sparse point cloud or combining a plurality of sparse point clouds, a point cloud of each hierarchy of the above-described hierarchical structure can be achieved. For example, by combining all sparse point clouds, a point cloud of the original density can be restored.

Figure 9:
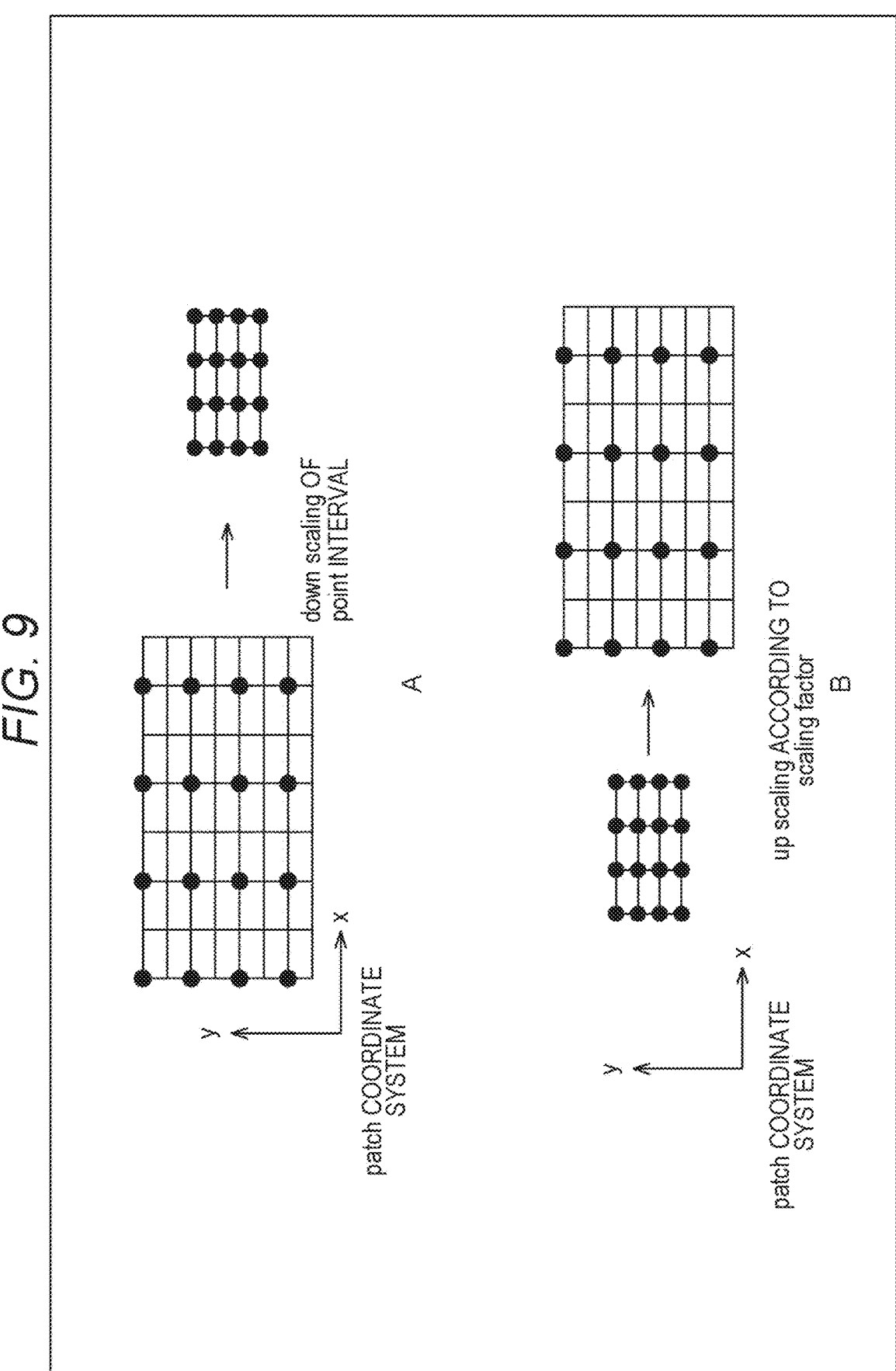
FIG. 9 is a diagram for explaining spatial scalability.

In the LoD patch mode, such point clouds can be hierarchized for each patch. Then, the point interval of the patch of the sparse point cloud can be scaled to a dense state (the point interval of the original point cloud) and encoded. For example, as illustrated in A of FIG. 9, the point interval can be encoded as a dense patch (small patch) by downscaling the point interval. Thus, it is possible to suppress a reduction in encoding efficiency due to hierarchization.

At the time of decoding, scaling is only required to be performed in the opposite direction. For example, as illustrated in B of FIG. 9, it is possible to restore sparse patches (large patches) by upscaling the point interval at the same ratio as that at the time of encoding.

In this case, a scaling factor that is information regarding such scaling is transmitted from the encoding side to the decoding side for each patch. That is, the scaling factor is stored in the V3C bitstream. FIG. 10 is a diagram illustrating an example of syntax of this scaling factor. pdu_lod_scale_x_minus1[patchIndex] illustrated in FIG. 10 indicates a conversion ratio in an x-direction of the downscale for each patch, and pdu_lod_scale_y[patchIndex] indicates a conversion ratio in a y-direction of the downscale for each patch. At the time of decoding, by upscaling with the conversion ratio indicated by these parameters (that is, upscaling on the basis of the scaling factor), it is possible to easily upscale with the same conversion ratio as that at the time of encoding (downscaling).

Figure 11:
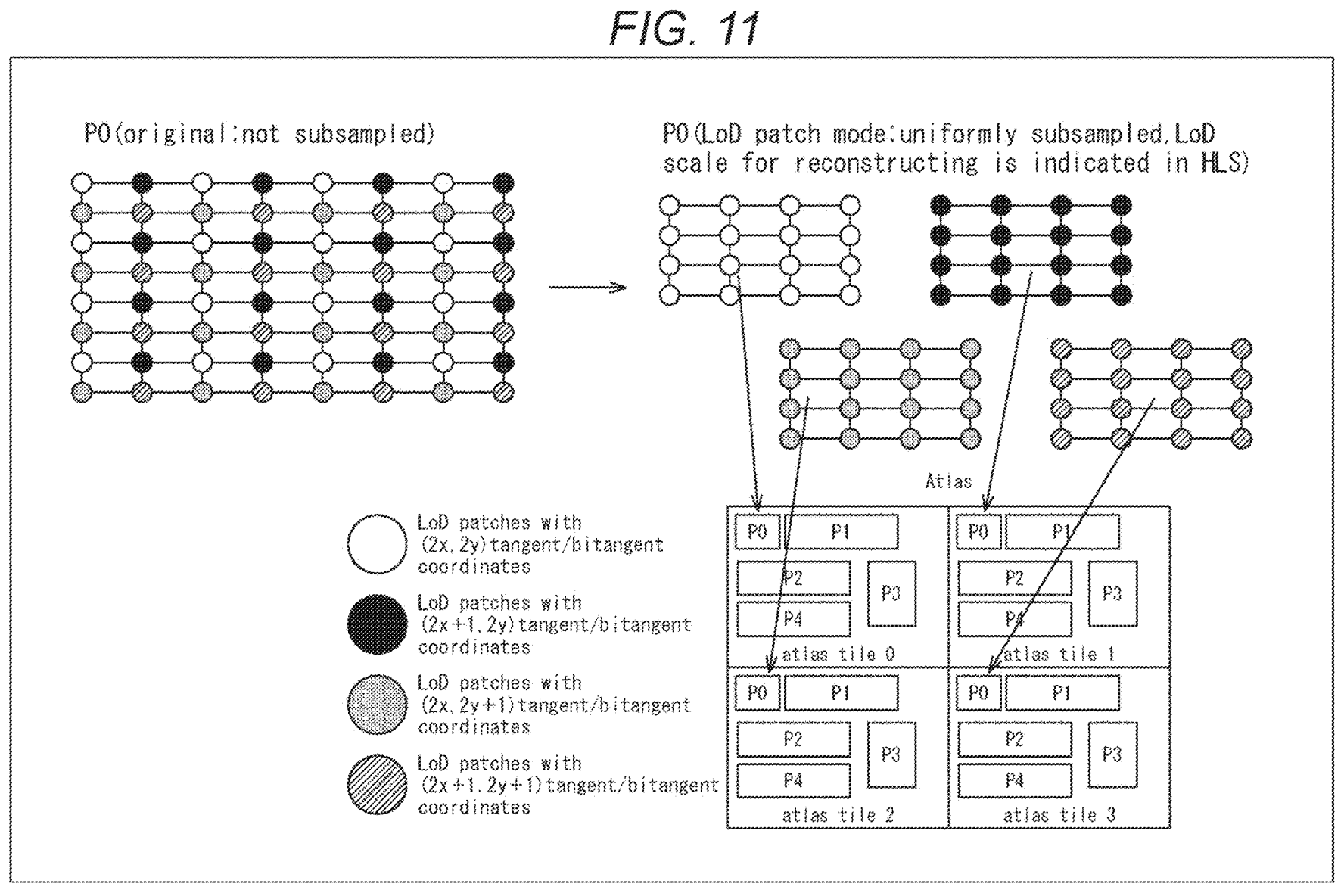

As described above, in the LoD patch mode, one point cloud is divided into a plurality of sparse point clouds so as to indicate the same object as each other and encoded. Such division is performed for each patch. That is, as illustrated in FIG. 11, the patch is divided into a plurality of patches including points of different sample grids from each other. A patch P0 illustrated on the left side of FIG. 11 indicates an original patch (dense patch), and each circle indicates a point constituting the patch. In FIG. 11, points of the patch P0 are grouped by four kinds of sample grids, and four sparse patches are formed. That is, a white point, a black point, a gray point, and a hatched point are extracted from the patch P0, and are divided into sparse patches different from each other. That is, in this case, four sparse patches in which the density of points is ½ (double the point interval) in each of the x direction and the y direction with respect to the original patch P0 are formed. By using a single such sparse patch or combining a plurality of such sparse patches, spatial scalability (resolution scalability) can be achieved.

Sparse patches are downscaled during encoding, as described above. In the LoD patch mode, such a division is performed for each of the original dense patches. Then, the divided sparse patches are collected in the atlas tile for each sample grid when arranged in the frame image. For example, in FIG. 11, sparse patches including points indicated by white circles are arranged in "atlas tile 0", sparse patches including points indicated by black circles are arranged in "atlas tile 1", sparse patches including points indicated by gray circles are arranged in "atlas tile 2", and sparse patches including points indicated by hatched circles are arranged in "atlas tile 3". By dividing the atlas tiles arranged in this manner, patches corresponding to the same sample grid as each other can be decoded independently of the others. That is, a point cloud can be constructed for each sample grid. Therefore, the spatial scalability can be achieved.

<Non-Support of Spatial Scalability>

As described above, in MPEG-I Part 5: Visual Volumetric Video-based Coding (V3C) and Video-based Point Cloud Compression (V-PCC), by encoding in the LoD patch mode, the client can independently decode a low LoD (sparse) point cloud constituting a high LoD (dense) point cloud, and construct a low LoD point cloud.

By using such spatial scalability, it is possible to acquire V-PCC content of an appropriate LoD according to a network bandwidth limitation or variation at the time of distribution of the V-PCC content, performance of decoding processing or rendering processing of a client device, or the like. Therefore, distribution support using the spatial scalability is desired in the MPEG-I part 10.

However, ISOBMFF that stores the V3C bitstream described in Non Patent Document 4 does not support this spatial scalability, and it has been difficult to store information regarding the spatial scalability in the system layer as information different from the V3C bitstream. Thus, the client cannot identify a combination of point clouds that provides the spatial scalability at the time of V-PCC content distribution, and cannot select an appropriate LoD point cloud according to a client environment.

In order for the client to construct 3D data with a desired LoD using this spatial scalability, complicated work such as parsing the V3C bitstream (atlas sub-bitstream) up to a patch data unit (patch data unit) is required.

2. First Embodiment

<File Storing Bitstream and Spatial Scalability Information>

Accordingly, the information regarding the spatial scalability is stored (stored in the system layer) as information different from the V3C bitstream in a file (for example, ISOBMFF) that stores the V3C bitstream.

For example, in an information processing method includes encoding 2D data obtained by two-dimensionally converting a point cloud representing an object having a three-dimensional shape as a set of points and corresponding to spatial scalability, and generating a bitstream including a sub-bitstream obtained by encoding the point cloud corresponding to a single or plurality of layers of the spatial scalability, generating spatial scalability information regarding the spatial scalability of the sub-bitstream, and generating a file that stores the bitstream generated and the spatial scalability information generated.

For example, an information processing device includes an encoding unit that encodes 2D data obtained by two-dimensionally converting a point cloud representing an object having a three-dimensional shape as a set of points and corresponding to spatial scalability, and generates a bitstream including a sub-bitstream obtained by encoding the point cloud corresponding to a single or plurality of layers of the spatial scalability, a spatial scalability information generation unit that generates spatial scalability information regarding the spatial scalability of the sub-bitstream, and a file generation unit that generates a file that stores the bitstream generated by the encoding unit and the spatial scalability information generated by the spatial scalability information generation unit.

Figure 12:
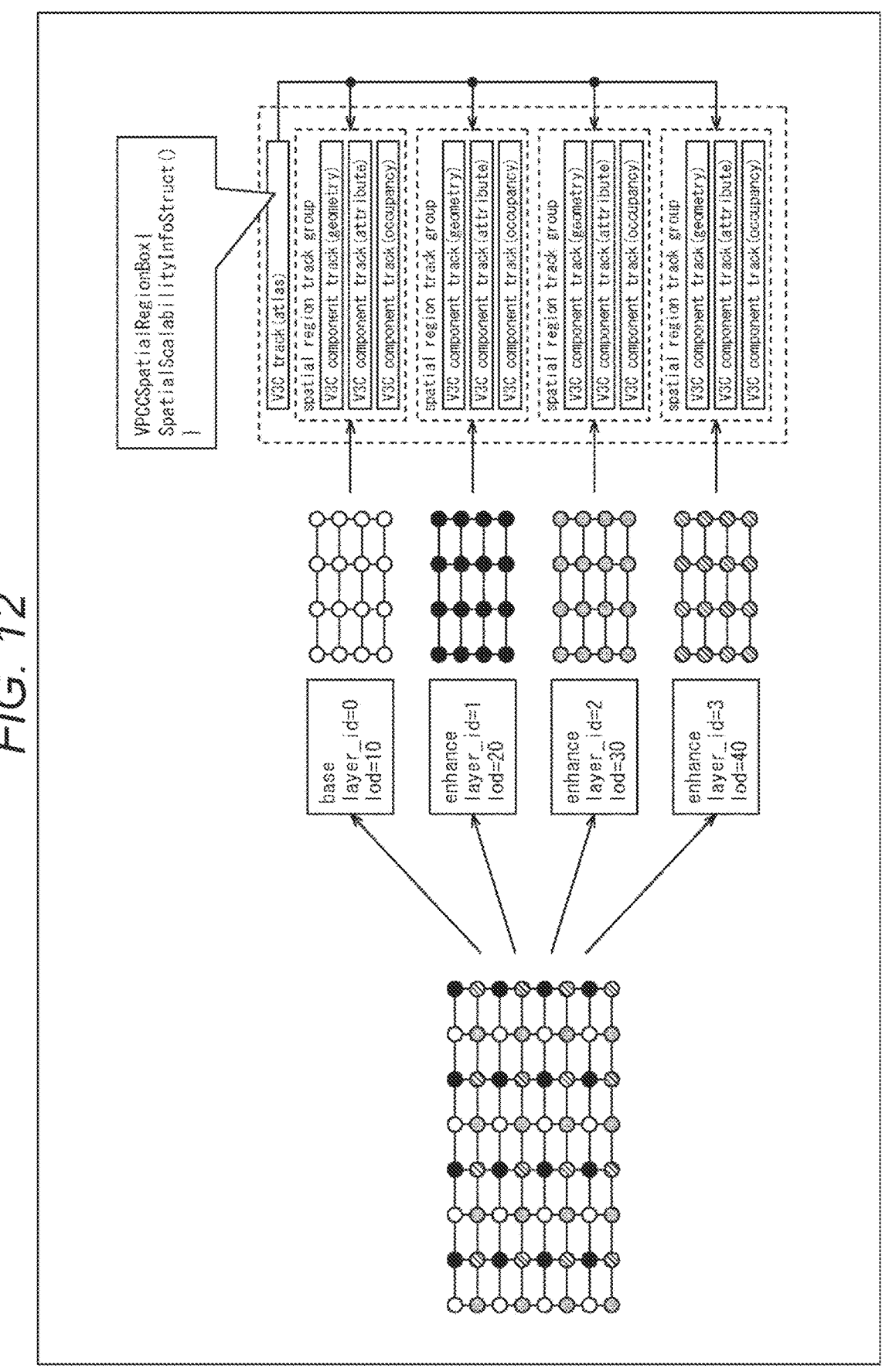
FIG. 12 is a diagram illustrating an example of a file structure for storing spatial scalability information.

For example, as illustrated in FIG. 12, a spatial scalability InfoStruct (SpatialScalabilityInfoStruct) is newly defined, and the spatial scalability InfoStruct is stored in a VPCC spatial region box (VPCCSpatialRegionsBox) of a sample entry (SampleEntry). Then, the spatial scalability information is stored in the spatial scalability InfoStruct.

By doing so, the spatial scalability information can be provided in the system layer to the client device that decodes the V3C bitstream. Therefore, the client device can more easily reproduce 3D data using the spatial scalability without requiring complicated work such as analyzing the V3C bitstream.

For example, an information processing method includes selecting a layer of spatial scalability to be decoded on the basis of spatial scalability information stored in a file and regarding the spatial scalability of a bitstream obtained by encoding 2D data obtained by two-dimensionally converting a point cloud representing an object having a three-dimensional shape as a set of points and corresponding to the spatial scalability, extracting a sub-bitstream corresponding to the selected layer from the bitstream stored in the file, and decoding the extracted sub-bitstream.

For example, an information processing device includes a selection unit that selects a layer of spatial scalability to be decoded on the basis of spatial scalability information stored in a file and regarding the spatial scalability of a bitstream obtained by encoding 2D data obtained by two-dimensionally converting a point cloud representing an object having a three-dimensional shape as a set of points and corresponding to the spatial scalability, an extraction unit that extracts a sub-bitstream corresponding to the layer selected by the selection unit from the bitstream stored in the file, and a decoding unit that decodes the sub-bitstream extracted by the extraction unit.

For example, as illustrated in FIG. 12, in ISOBMFF described in Non Patent Document 4 in which a V3C bitstream is stored, a layer of the spatial scalability to be decoded is selected on the basis of the spatial scalability information stored in the spatial scalability InfoStruct in the VPCC spatial region box of the sample entry.

By doing so, the client device can identify a combination of point clouds that provides the spatial scalability on the basis of the spatial scalability information stored in the system layer. Therefore, for example, in the V-PCC content distribution, the client device can select an appropriate point cloud of LoD according to the client environment without requiring complicated work such as analyzing the bitstream.

For example, the client device can perform control such as acquiring a portion of the point cloud close to the viewpoint with high LoD and acquiring other distant portions with low LoD. Therefore, the client device can more effectively use the band even under the network bandwidth limitation, and provide the user with a high-quality media experience.

That is, the client device can more easily reproduce 3D data using the spatial scalability.

For example, as the spatial scalability information, base enhancement grouping information designating a selection order (layer) of each group (sparse patch) such as which group (sparse patch) is set as a base layer and which group (sparse patch) is set as an enhancement layer may be stored in the system layer.

By doing so, the client device can easily grasp which group is needed for constructing the point cloud of the desired LoD on the basis of the spatial scalability information. Therefore, the client device can more easily select the point cloud of an appropriate LoD.

Furthermore, as illustrated in FIG. 12, the bitstreams of the respective layers (groups) may be stored in different tracks (spatial region track groups) of ISOBMFF from each other. In a case of the example of FIG. 12, sparse patches including points indicated by white circles, sparse patches including points indicated by black circles, sparse patches including points indicated by gray circles, and sparse patches including points indicated by hatched circles are stored in different spatial region track groups from each other. By doing so, the client device can select a bitstream of a desired layer (group) by selecting a track (spatial region track group) to be decoded. That is, the client device can more easily acquire and decode the bitstream of the desired layer (group).

<Example of Spatial Scalability Information>

A of FIG. 13 is a diagram illustrating an example of syntax of the VPCC spatial region box (VPCCSpatialRegionsBox). In a case of the example in A of FIG. 13, the spatial scalability InfoStruct (SpatialScalabilityInfoStruct ( )) is stored for each region in the VPCC spatial region box.

B of FIG. 13 is a diagram illustrating an example of syntax of the spatial scalability InfoStruct (SpatialScalabilityInfoStruct( )). As illustrated in B of FIG. 13, layer identification information (layer_id) may be stored in the spatial scalability InfoStruct as the spatial scalability information. The layer identification information is identification information indicating a layer corresponding to the sub-bitstream stored in the track group corresponding to the spatial scalability InfoStruct of ISOBMFF. For example, layer_id=0 indicates the base layer, and layer_id=1 to 255 indicate the enhancement layer.

That is, a file generation device may store the layer identification information (layer_id) in the spatial scalability InfoStruct, and the client device may select the sub-bitstream (track) on the basis of the layer identification information. By doing so, the client device can grasp the layer corresponding to the sub-bitstream (sparse patch) stored in each track (spatial region track group) on the basis of the layer identification information. Therefore, the client device can more easily select a point cloud that achieves high definition in the order intended by the content creator. Therefore, the client device can more easily reproduce the 3D data by using the spatial scalability.

Furthermore, as illustrated in B of FIG. 13, in addition to the layer identification information, information (lod) regarding the resolution of a point cloud obtained by reconstructing the point cloud corresponding to each layer from the highest layer of the spatial scalability to the layer indicated by the layer identification information may be stored in the spatial scalability InfoStruct.

For example, in a case where layer_id=0 is satisfied, the information (lod) regarding the resolution of the point cloud indicates an LoD value of the base layer. Furthermore, for example, in a case where layer_id=0 is not satisfied, the information (lod) regarding the resolution of the point cloud indicates the LoD value obtained by being simultaneously displayed with the point clouds of the layers 0 to (layer_id−1). Note that the LoD value may be a reference value determined by a content creator. Note that the information (lod) regarding the resolution of the point cloud may not be signaled, and the value of layer_id may signal the information regarding the resolution of the point cloud. That is, the information (lod) regarding the resolution of the point cloud may be included in the layer identification information (layer_id). For example, the value of layer_id may also indicate the resolution (lod value) of the point cloud corresponding to each layer from the highest layer of the spatial scalability to the layer indicated by the layer identification information.

That is, the file generation device may store the information (lod) regarding the resolution of the point cloud in the spatial scalability InfoStruct, and the client device may select the sub-bitstream (track) on the basis of the information regarding the resolution of the point cloud. By doing so, the client device can more easily grasp which track (spatial region track group) needs to be selected in order to obtain the desired LoD. Therefore, the client device can more easily reproduce the 3D data by using the spatial scalability.

Furthermore, as illustrated in B of FIG. 13, in addition to the layer identification information, the spatial scalability identification information (spatial_scalability_id) for identifying the spatial scalability may be stored in the spatial scalability InfoStruct. A group of regions (one loop of for loops of num_region corresponds to one region) having the same spatial scalability identification information (spatial_scalability_id) as each other provides the spatial scalability. That is, when a plurality of regions having the same spatial scalability identification information (spatial_scalability_id) as each other is combined, a high LoD point cloud can be obtained.

That is, the file generation device may store the spatial scalability identification information (spatial_scalability_id) in the spatial scalability InfoStruct, and the client device may select the sub-bitstream (track) on the basis of the spatial scalability identification information. By doing so, the client device can more easily specify the group that provides the spatial scalability. Therefore, the client device can more easily reproduce the 3D data by using the spatial scalability.

Note that, as illustrated in A of FIG. 13, a spatial scalability flag (spatial_scalability_flag) may be stored in the VPCC spatial region box. The spatial scalability flag is flag information indicating whether or not the spatial scalability InfoStruct is stored. In a case where the spatial scalability flag is true (for example, "1"), it indicates that the spatial scalability InfoStruct is stored. Furthermore, in a case where the spatial scalability flag is false (for example, "0"), it indicates that the spatial scalability InfoStruct is not stored.

<Another Example of Spatial Scalability Information>

Note that, as in the example illustrated in A of FIG. 14, in the VPCC spatial region box (VPCCSpatialRegionsBox), the spatial scalability InfoStruct (SpatialScalabilityInfoStruct ( )) and the track group identification information (track_group_id) may be stored for each region by using the for loop by the number of layers.

In this case, the group stored by the for loop provides the spatial scalability. That is, the for loop summarizes the spatial scalability InfoStruct that provides the same spatial scalability as each other. Therefore, in this case, it is not necessary to store the spatial scalability identification information (spatial_scalability_id). In other words, the spatial scalability can be identified without the need to store the spatial scalability identification information.

An example of syntax of the spatial scalability InfoStruct (SpatialScalabilityInfoStruct( )) in this case is illustrated in B of FIG. 14. In a case of the example in B of FIG. 14, the above-described layer identification information (layer_id) and the information (lod) regarding the resolution of the point cloud are stored in the spatial scalability InfoStruct.

Note that, also in this case, as illustrated in A of FIG. 14, a spatial scalability flag (spatial_scalability_flag) may be stored in the VPCC spatial region box.

<Matroska Media Container>

Figure 15:
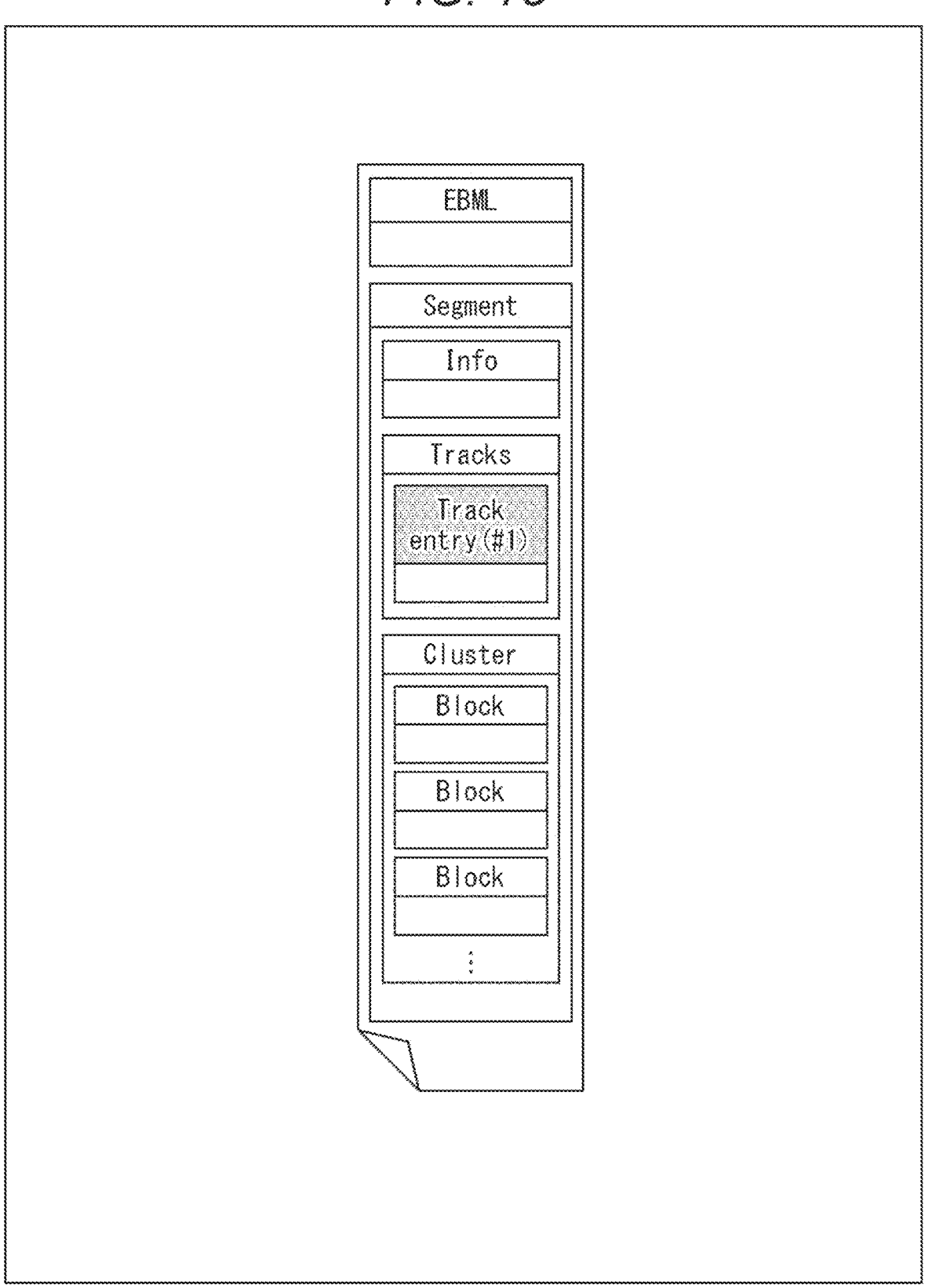
FIG. 15 is a diagram illustrating a configuration example of a Matroska media container.

Although the example in which ISOBMFF is applied as the file format has been described above, the file that stores the V3C bitstream is arbitrary and may be other than ISOBMFF. For example, the V3C bitstream may be stored in a Matroska media container. A main configuration example of the Matroska media container is illustrated in FIG. 15.

For example, the spatial scalability information (or base enhancement point cloud information) may be stored in an element under a Track Entry element of a track that stores the atlas sub-bitstream.

<File Generation Device>

Figure 16:
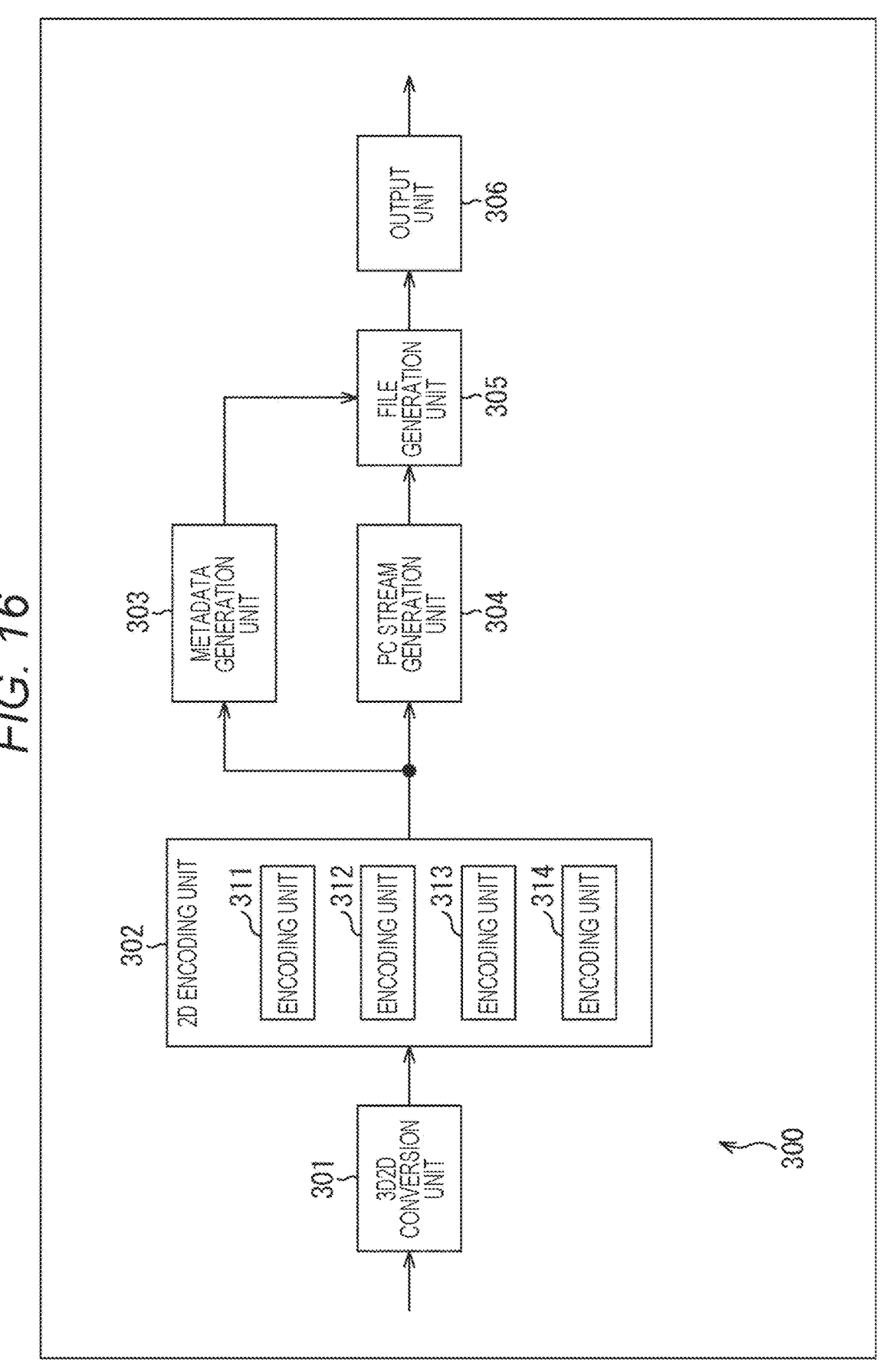
FIG. 16 is a block diagram illustrating a main configuration example of a file generation device.

FIG. 16 is a block diagram illustrating an example of a configuration of a file generation device that is an aspect of an information processing device to which the present technology is applied. A file generation device 300 illus-trated in FIG. 16 is a device that applies V-PCC and encodes point cloud data as the video frame by the encoding method for two-dimensional images by applying V-PCC. Further-more, the file generation device 300 generates ISOBMFF and stores the V3C bitstream generated by the encoding.

At that time, the file generation device 300 applies the present technology described above in the present embodi-ment, and stores information in ISOBMFF so as to enable the spatial scalability. That is, the file generation device 300 stores information regarding the spatial scalability in ISOBMFF.

Note that while FIG. 16 illustrates main elements such as processing units and data flows, those depicted in FIG. 16 do not necessarily include all elements. That is, in the file generation device 300, there may be a processing unit not illustrated as a block in FIG. 16, or there may be a process or a data flow not illustrated as an arrow or the like in FIG. 16.

As illustrated in FIG. 16, the file generation device 300 includes a 3D2D conversion unit 301, a 2D encoding unit 302, a metadata generation unit 303, a PC stream generation unit 304, a file generation unit 305, and an output unit 306.

The 3D2D conversion unit 301 decomposes a point cloud, which is 3D data input to the file generation device 300, into patches and packs the patches. That is, the 3D2D conversion unit 301 generates the geometry video frame, the attribute video frame, and an occupancy video frame. At that time, as described with reference to, for example, FIGS. 11 and 12 and the like, the 3D2D conversion unit 301 divides the point cloud into a plurality of sparse point clouds, and arranges each patch in the frame image so as to be collected into the atlas tile for each sample grid (for each patch providing the same spatial scalability as each other). Furthermore, the 3D2D conversion unit 301 generates the atlas information. The 3D2D conversion unit 301 supplies the generated geometry video frame, attribute video frame, occupancy video frame, atlas information, and the like to the 2D encoding unit 302.

The 2D encoding unit 302 performs processing related to encoding. For example, the 2D encoding unit 302 acquires the geometry video frame, the attribute video frame, the occupancy video frame, the atlas information, and the like supplied from the 3D2D conversion unit 301. The 2D encoding unit 302 encodes them to generate a sub-bitstream. For example, the 2D encoding unit 302 includes an encoding unit 311 to an encoding unit 314. The encoding unit 311 encodes the geometry video frame to generate the geometry video sub-bitstream. Furthermore, the encoding unit 312 also encodes the attribute video frame to generate the attribute video sub-bitstream. Moreover, the encoding unit 313 encodes the occupancy video frame to generate the occupancy video sub-bitstream. Furthermore, the encoding unit 314 encodes the atlas information to generate the atlas sub-bitstream.

At that time, the 2D encoding unit 302 applies the LoD patch mode, encodes each piece of patch information of sparse point clouds as the atlas tile, and generates one atlas sub-bitstream. Furthermore, the 2D encoding unit 302 applies the LoD patch mode, encodes three images (geom-etry image, attribute image, and occupancy map) for each of the sparse point clouds, and generates the geometry video sub-bitstream, the attribute video sub-bitstream, and the occupancy video sub-bitstream.

The 2D encoding unit 302 supplies the generated sub-bitstream to the metadata generation unit 303 and the PC stream generation unit 304. For example, the encoding unit 311 supplies the generated geometry video sub-bitstream to the metadata generation unit 303 and the PC stream generation unit 304. Furthermore, the encoding unit 312 supplies the generated attribute video sub-bitstream to the metadata generation unit 303 and the PC stream generation unit 304. Moreover, the encoding unit 313 supplies the generated occupancy video sub-bitstream to the metadata generation unit 303 and the PC stream generation unit 304. Furthermore, the encoding unit 314 supplies the generated atlas sub-bitstream to the metadata generation unit 303 and the PC stream generation unit 304.

The metadata generation unit 303 performs processing related to generation of metadata. For example, the metadata generation unit 303 acquires the video sub-bitstream and the atlas sub-bitstream supplied from the 2D encoding unit 302. Furthermore, the metadata generation unit 303 generates the metadata using data thereof.

For example, the metadata generation unit 303 generates, as metadata, the spatial scalability information regarding the spatial scalability of the acquired sub-bitstream. That is, the metadata generation unit 303 generates the spatial scalability information by using any single method among the various methods described with reference to FIGS. 12 to 14 and the like or by appropriately combining any plurality of the methods. Note that the metadata generation unit 303 can generate any metadata other than the spatial scalability information.

When generating the metadata including the spatial scalability information in this manner, the metadata generation unit 303 supplies the metadata to the file generation unit 305.

The PC stream generation unit 304 performs processing related to generation of the V3C bitstream. For example, the PC stream generation unit 304 acquires the video sub-bitstream and the atlas sub-bitstream supplied from the 2D encoding unit 302. Furthermore, the PC stream generation unit 304 generates, by using these sub-bitstreams, the V3C bitstream (geometry video sub-bitstream, attribute video sub-bitstream, occupancy map video sub-bitstream, and atlas sub-bitstream, or a collection thereof), and supplies the V3C bitstream to the file generation unit 305.

The file generation unit 305 performs processing related to generation of a file. For example, the file generation unit 305 acquires the metadata including the spatial scalability information supplied from the metadata generation unit 303. Furthermore, the file generation unit 305 acquires the V3C bitstream supplied from the PC stream generation unit 304. The file generation unit 305 generates a file (for example, ISOBMFF or the Matroska media container) that stores the acquired metadata and V3C bitstream. That is, the file generation unit 305 stores the spatial scalability information in a file separately from the V3C bitstream. That is, the file generation unit 305 stores the spatial scalability information in the system layer.

At that time, the file generation unit 305 stores the spatial scalability information in the file by using any single method among the various methods described with reference to FIGS. 12 to 14 and the like, or by appropriately combining any plurality of the methods. For example, the file generation unit 305 stores the spatial scalability information in the location of the examples illustrated in FIGS. 12 to 14 in the file that stores the V3C bitstream.

The file generation unit 305 supplies the generated file to the output unit 306. The output unit 306 outputs the supplied file (the file including the V3C bitstream and the spatial scalability information) to the outside of the file generation device 300 (for example, a distribution server or the like).

As described above, the file generation device 300 applies the present technology described above in the present embodiment to generate a file (for example, ISOBMFF or the Matroska media container) that stores a V3C bitstream and the spatial scalability information.

With such a configuration, it is possible to provide the spatial scalability information in the system layer to the client device that decodes the 3C bitstream. Therefore, the client device can more easily reproduce 3D data using the spatial scalability without requiring complicated work such as analyzing the V3C bitstream.

Note that these processing units (the 3D2D conversion unit 301 to the output unit 306, and the encoding unit 311 to the encoding unit 314) have an arbitrary configuration. For example, each processing unit may be configured by a logic circuit that achieves the above-described processing. Furthermore, each processing unit may include, for example, a central processing unit (CPU), a read only memory (ROM), a random access memory (RAM), and the like, and execute a program using them, to thereby implement the above-described processing. Of course, each processing unit may have both the configurations, and a part of the above-described processing may be implemented by a logic circuit and the other may be implemented by executing a program. The configurations of the processing units may be independent from each other, and for example, a part of the processing units may implement a part of the above-described processing by a logic circuit, another part of the processing units may implement the above-described processing by executing a program, and still another of the processing units may implement the above-described processing by both the logic circuit and the execution of the program.

<Flow of File Generation Processing>

An example of a flow of file generation processing executed by the file generation device 300 will be described with reference to a flowchart of FIG. 17.

When the file generation processing is started, the 3D2D conversion unit 301 of the file generation device 300 divides the point cloud into a plurality of sparse point clouds in step S301. In step S302, the 3D2D conversion unit 301 decomposes the point cloud into patches to generate the geometry and attribute patches. Then, the 3D2D conversion unit 301 packs the patches in the video frame. Furthermore, the 3D2D conversion unit 301 generates the occupancy map and the atlas information.

In step S303, the 2D encoding unit 302 applies the LoD patch mode, encodes each piece of the patch information of the sparse point clouds as the atlas tile, and generates one atlas sub-bitstream.

In step S304, the 2D encoding unit 302 encodes each of three images (geometry video frame, attribute video frame, occupancy map video frame) for each of the sparse point clouds, and generates the geometry video sub-bitstream, the attribute video sub-bitstream, and the occupancy video sub-bitstream.

The PC stream generation unit 304 generates a V3C bitstream (point cloud stream) using the video sub-bitstream, the atlas sub-bitstream, and the like.

In step S305, the metadata generation unit 303 generates metadata including the spatial scalability information. That is, the metadata generation unit 303 generates the spatial scalability information by using any single method among the various methods described with reference to FIGS. 12 to 14 and the like or by appropriately combining any plurality of the methods. For example, the metadata generation unit 303 generates base enhancement point cloud information as the spatial scalability information.

In step S306, the file generation unit 305 generates a file such as ISOBMFF or the Matroska media container, for example, and stores the spatial scalability information and the V3C bitstream in the file. At that time, the file generation unit 305 stores the spatial scalability information in the file by using any single method among the various methods described with reference to FIGS. 12 to 14 and the like, or by appropriately combining any plurality of the methods. For example, the file generation unit 305 stores the base enhancement point cloud information generated in step S305 in the file.

In step S307, the output unit 306 outputs the file generated in step S306, that is, the file that stores the V3C bitstream and the spatial scalability information to the outside of the file generation device 300 (for example, the distribution server or the like). When the process of step S307 ends, the file generation processing ends.

By executing each processing in this manner, the spatial scalability information can be provided in the system layer to the client device that decodes the 3C bitstream. Therefore, the client device can more easily reproduce 3D data using the spatial scalability without requiring complicated work such as analyzing the V3C bitstream.

<Client Device>

Figure 18:
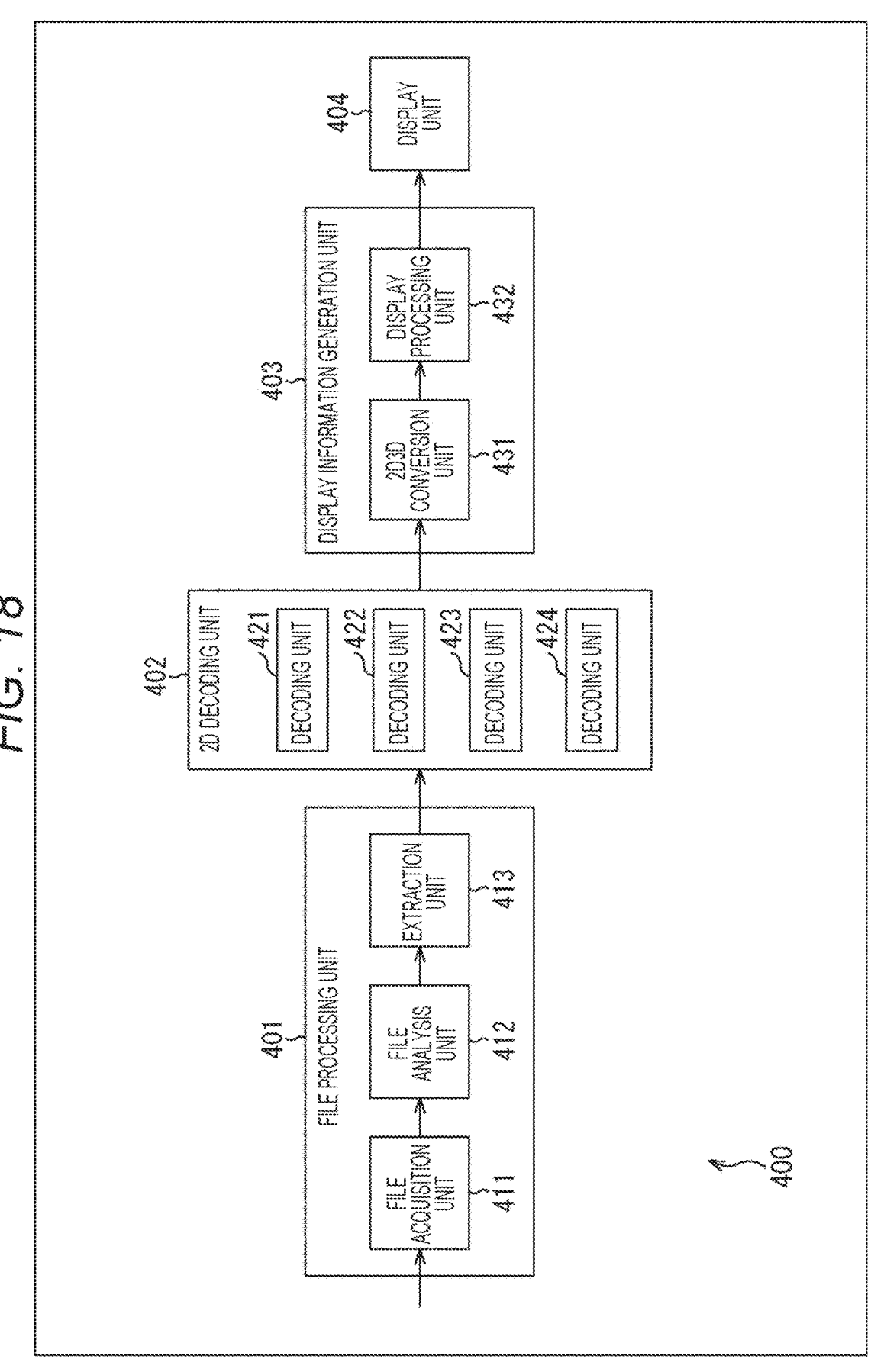
FIG. 18 is a block diagram illustrating a main configuration example of a client device.

The present technology described above in the present embodiment can be applied not only to the file generation device but also to a client device. FIG. 18 is a block diagram illustrating an example of a configuration of a client device that is an aspect of an information processing device to which the present technology is applied. A client device 400 illustrated in FIG. 18 is a device that applies V-PCC, acquires the V3C bitstream (geometry video sub-bitstream, attribute video sub-bitstream, occupancy video sub-bitstream, and atlas sub-bitstream, or a collection thereof) encoded by the encoding method for two-dimensional images using the point cloud data as the video frame from the file, decodes the V3C bitstream by a decoding method for two-dimensional images, and generates (reconstructs) the point cloud. For example, the client device 400 can extract the V3C bitstream from the file generated by the file generation device 300 and decode the V3C bitstream to generate the point cloud.

At that time, the client device 400 achieves the spatial scalability by using any single method among the various methods of the present technology described above in the present embodiment, or by appropriately combining any plurality of the methods. That is, the client device 400 selects and decodes a bitstream (track) necessary for reconstructing the point cloud of the desired LoD on the basis of the spatial scalability information stored in the file together with the V3C bitstream.

Note that while FIG. 18 illustrates main elements such as processing units and data flows, those depicted in FIG. 18 do not necessarily include all elements. That is, in the client device 400, there may be a processing unit not illustrated as a block in FIG. 18, or there may be processing or a data flow not illustrated as an arrow or the like in FIG. 18.

As illustrated in FIG. 18, the client device 400 includes a file processing unit 401, a 2D decoding unit 402, a display information generation unit 403, and a display unit 404.

The file processing unit 401 extracts the V3C bitstream (sub-bitstream) from a file input to the client device 400, and supplies the V3C bitstream to the 2D decoding unit 402. At that time, the file processing unit 401 applies the present technology described in the present embodiment, and extracts the V3C bitstream (sub-bitstream) of a layer corresponding to the desired LoD or the like on the basis of the spatial scalability information stored in the file. Then, the file processing unit 401 supplies the extracted V3C bitstream to the 2D decoding unit 402.

That is, only the V3C bitstream of the extracted layer is to be decoded. In other words, the file processing unit 401 excludes the V3C bitstream of the layer unnecessary for constructing the point cloud of the desired LoD from decoding targets on the basis of the spatial scalability information.

The file processing unit 401 includes a file acquisition unit 411, a file analysis unit 412, and an extraction unit 413.

The file acquisition unit 411 acquires a file input to the client device 400. As described above, this file stores the V3C bitstream and the spatial scalability information. For example, this file is ISOBMFF, the Matroska media container, or the like. The file acquisition unit 411 supplies the acquired file to the file analysis unit 412.

The file analysis unit 412 acquires the file supplied from the file acquisition unit 411. The file analysis unit 412 analyzes the acquired file. At that time, the file analysis unit 412 analyzes the file by using any single method among the various methods of the present technology described in the present embodiment or by appropriately combining any plurality of the methods. For example, the file analysis unit 412 analyzes the spatial scalability information stored in the file and selects the sub-bitstream to be decoded. For example, on the basis of the spatial scalability information, the file analysis unit 412 selects a combination of point clouds (that is, the sub-bitstream to be decoded) that provide the spatial scalability according to the network environment or the processing capability of the client device 400 itself. The file analysis unit 412 supplies an analysis result thereof to the extraction unit 413 together with the file.

The extraction unit 413 extracts data to be decoded from the V3C bitstream stored in the file on the basis of the analysis result by the file analysis unit 412. That is, the extraction unit 413 extracts the sub-bitstream selected by the file analysis unit 412. The extraction unit 413 supplies the extracted data to the 2D decoding unit 402.

The 2D decoding unit 402 performs processing related to decoding. For example, the 2D decoding unit 402 acquires the geometry video sub-bitstream, the attribute video sub-bitstream, the occupancy video sub-bitstream, the atlas sub-bitstream, and the like supplied from the file processing unit 401. The 2D decoding unit 402 decodes them to generate the video frame and the atlas information. For example, the 2D decoding unit 402 includes a decoding unit 421 to a decoding unit 424. The decoding unit 421 decodes the supplied geometry video sub-bitstream to generate the geometry video frame (2D data). The decoding unit 422 decodes the attribute video sub-bitstream to generate the attribute video frame (2D data). The decoding unit 423 decodes the occupancy video sub-bitstream to generate the occupancy video frame (2D data). The decoding unit 424 decodes the atlas sub-bitstream, and generates the atlas information corresponding to the video frame described above.

The 2D decoding unit 402 supplies the generated bitstream to the display information generation unit 403. For example, the decoding unit 421 supplies the generated geometry video frame to the display information generation unit 403. The decoding unit 422 supplies the generated attribute video frame to the display information generation unit 403. The decoding unit 423 supplies the generated occupancy video frame to the display information generation unit 403. The decoding unit 424 supplies the generated atlas information to the display information generation unit 403.

The display information generation unit 403 performs processing related to construction and rendering of the point cloud. For example, the display information generation unit 403 acquires the video frame and the atlas information supplied from the 2D decoding unit 402. Furthermore, the display information generation unit 403 generates the point cloud from the patches packed in the acquired video frame on the basis of the acquired atlas information. Then, the display information generation unit 403 renders the point cloud to generate a display image, and supplies the display image to the display unit 404.

The display information generation unit 403 includes, for example, a 2D3D conversion unit 431 and a display processing unit 432.

The 2D3D conversion unit 431 converts the patches (2D data) arranged in the video frame supplied from the 2D decoding unit 402 into the point cloud (3D data). The 2D3D conversion unit 431 supplies the generated point cloud to the display processing unit 432.

The display processing unit 432 performs processing related to rendering. For example, the display processing unit 432 acquires the point cloud supplied from the 2D3D conversion unit 431. Furthermore, the display processing unit 432 renders the acquired point cloud to generate a display image. The display processing unit 432 supplies the generated display image to the display unit 404.

The display unit 404 includes, for example, a display device such as a monitor and displays a display image. For example, the display unit 404 acquires the display image supplied from the display processing unit 432. The display unit 404 displays the display image on the display device and presents the display image to the user or the like.

With such a configuration, the client device 400 can identify a combination of point clouds that provides the spatial scalability on the basis of the spatial scalability information stored in the system layer. Therefore, for example, in the V-PCC content distribution, the client device can select an appropriate point cloud of LoD according to the client environment without requiring complicated work such as analyzing the bitstream. That is, the client device can more easily reproduce 3D data using the spatial scalability.

Note that these processing units (the file processing unit 401 to the display unit 404, the file acquisition unit 311 to the extraction unit 413, the decoding unit 421 to the decoding unit 424, and the 2D3D conversion unit 431 and the display processing unit 432) have an arbitrary configuration. For example, each processing unit may be configured by a logic circuit that achieves the above-described processing. Furthermore, each processing unit may include, for example, a CPU, a ROM, a RAM, and the like, and execute a program using them, to thereby implement the above-described processing. Of course, each processing unit may have both the configurations, and a part of the above-described processing may be implemented by a logic circuit and the other may be implemented by executing a program. The configurations of the processing units may be independent from each other, and for example, a part of the processing units may implement a part of the above-described processing by a logic circuit, another part of the processing units may implement the above-described processing by executing a program, and still another of the processing units may implement the above-described processing by both the logic circuit and the execution of the program.

<Flow of Client Processing>

An example of a flow of client processing executed by the client device 400 will be described with reference to a flowchart of FIG. 19.

When the client processing is started, the file acquisition unit 411 of the client device 400 acquires the file to be supplied to the client device 400 in step S401. This file stores the V3C bitstream and the spatial scalability information. For example, this file is ISOBMFF, the Matroska media container, or the like.

In step S402, the file analysis unit 412 selects a combination of point clouds that provides the spatial scalability according to the network environment and the processing capability of the client device 400 itself on the basis of the spatial scalability information (for example, the base enhancement point cloud information) stored in the file.

In step S403, the extraction unit 413 extracts the atlas sub-bitstream and the video sub-bitstream corresponding to a plurality of sparse point clouds selected in step S402 from the V3C bitstream stored in the file.

In step S404, the 2D decoding unit 402 decodes the atlas sub-bitstream and the video sub-bitstream extracted in step S403.

In step S405, the display information generation unit 403 constructs the point cloud on the basis of the data obtained by decoding in step S403. That is, the point cloud of the desired LoD extracted from the file is constructed.

In step S406, the display information generation unit 403 renders the constructed point cloud and generates a display image.

In step S407, the display unit 404 causes the display device to display the display image generated in step S406.

When the process of step S407 ends, the client processing ends.

By executing each processing as described above, the client device 400 can identify a combination of point clouds that provides the spatial scalability on the basis of the spatial scalability information stored in the system layer. Therefore, for example, in the V-PCC content distribution, the client device can select an appropriate point cloud of LoD according to the client environment without requiring complicated work such as analyzing the bitstream. That is, the client device can more easily reproduce 3D data using the spatial scalability.

3. Second Embodiment

<Control File that Stores Spatial Scalability Information>

The present technology can also be applied to, for example, Moving Picture Experts Group phase—Dynamic Adaptive Streaming over HTTP (MPEG-DASH). For example, in MPEG-DASH, a media presentation description (MPD) which is a control file that stores control information related to distribution of a bitstream may be extended, and the spatial scalability information related to the spatial scalability of the sub-bitstream may be stored.

For example, an information processing method includes encoding 2D data obtained by two-dimensionally converting a point cloud representing an object having a three-dimensional shape as a set of points and corresponding to spatial scalability, and generating a bitstream including a sub-bitstream obtained by encoding the point cloud corresponding to a single or plurality of layers of the spatial scalability, generating spatial scalability information regarding the spatial scalability of the sub-bitstream, and generating a control file that stores the spatial scalability information generated and control information regarding distribution of the bitstream generated.

For example, an information processing device includes an encoding unit that encodes 2D data obtained by two-dimensionally converting a point cloud representing an object having a three-dimensional shape as a set of points and corresponding to spatial scalability, and generates a bitstream including a sub-bitstream obtained by encoding the point cloud corresponding to a single or plurality of layers of the spatial scalability, a spatial scalability information generation unit that generates spatial scalability information regarding the spatial scalability of the sub-bitstream, and a control file generation unit that generates a control file that stores the spatial scalability information generated by the spatial scalability information generation unit and control information regarding distribution of the bitstream generated by the encoding unit.

Figure 20:
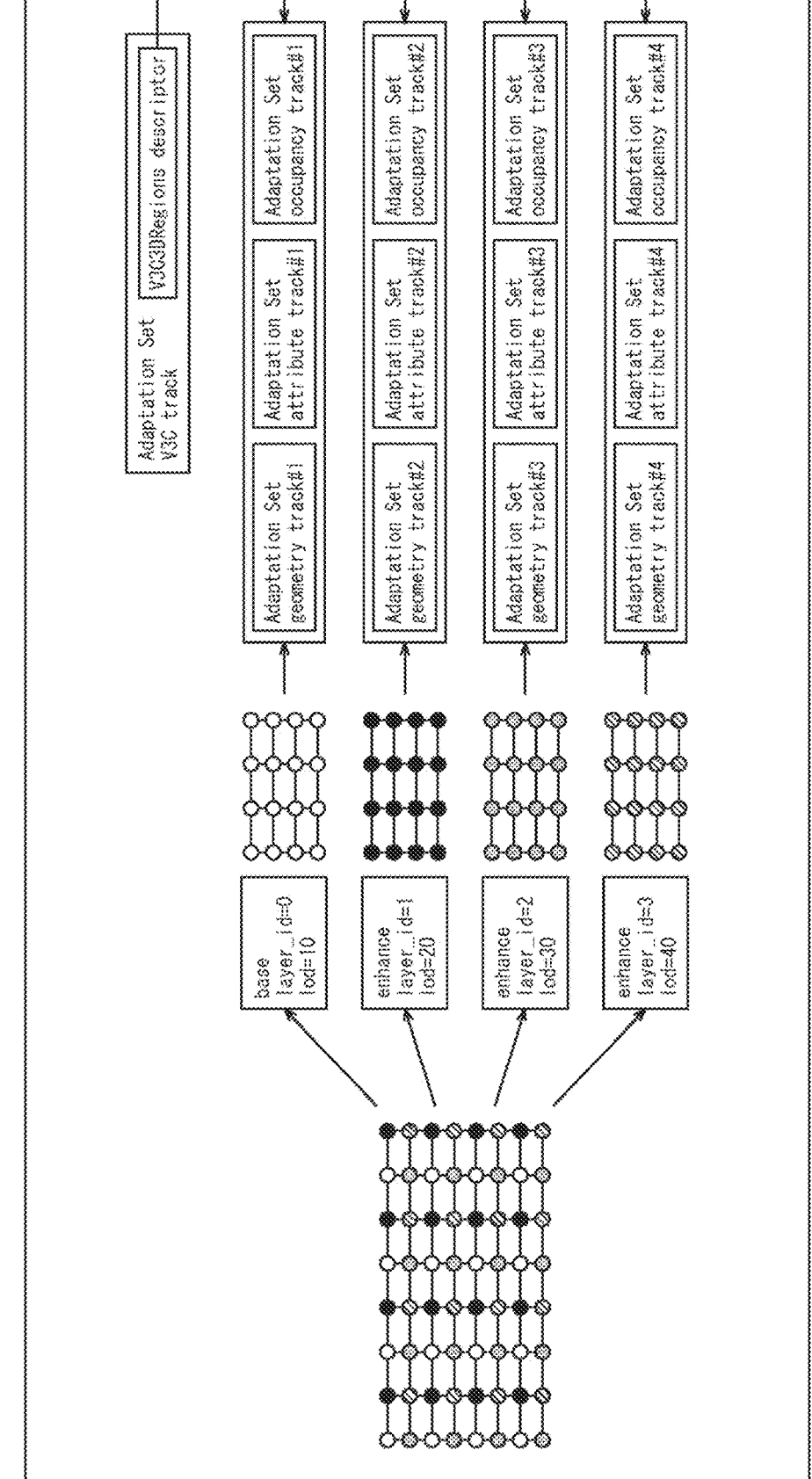
FIG. 20 is a diagram illustrating a configuration example of an MPD that stores the spatial scalability information.

For example, as illustrated in FIG. 20, a V3C3D region descriptor (V3C3DRegions descriptor) of the MPD may be extended to store the spatial scalability information (for example, the base enhancement point cloud information).

By doing so, it is possible to provide the spatial scalability information in the system layer (MPD) to the client device that acquires the V3C bitstream to be decoded by using the MPD. Therefore, the client device can more easily reproduce 3D data using the spatial scalability without requiring complicated work such as analyzing the V3C bitstream.

For example, an information processing method includes selecting a layer of spatial scalability to be decoded on the basis of spatial scalability information stored in a control file storing control information regarding distribution of a bit-stream, the spatial scalability information regarding the spatial scalability of the bitstream obtained by encoding 2D data obtained by two-dimensionally converting a point cloud representing an object having a three-dimensional shape as a set of points and corresponding to the spatial scalability, acquiring a sub-bitstream corresponding to the layer selected, and decoding the sub-bitstream acquired.

For example, an information processing device includes a selection unit that selects a layer of spatial scalability to be decoded on the basis of spatial scalability information stored in a control file storing control information regarding distribution of a bitstream, the spatial scalability information regarding the spatial scalability of the bitstream obtained by encoding 2D data obtained by two-dimensionally converting a point cloud representing an object having a three-dimensional shape as a set of points and corresponding to the spatial scalability, an acquisition unit that acquires a sub-bitstream corresponding to the layer selected by the selection unit, and a decoding unit that decodes the sub-bitstream acquired by the acquisition unit.

For example, as illustrated in FIG. 20, a layer of the spatial scalability to be decoded may be selected on the basis of the spatial scalability information (for example, the base enhancement point cloud information) stored in the V3C3D region descriptor (V3C3DRegions descriptor) of the MPD.

In this manner, the client device can identify a combination of point clouds that provides the spatial scalability on the basis of the spatial scalability information stored in its system layer (MPD). Therefore, for example, in the V-PCC content distribution, the client device can select an appropriate point cloud of LoD according to the client environment without requiring complicated work such as analyzing the bitstream.

For example, the client device can perform control such as acquiring a portion of the point cloud close to the viewpoint with high LoD and acquiring other distant portions with low LoD. Therefore, the client device can more effectively use the band even under the network bandwidth limitation, and provide the user with a high-quality media experience.

That is, the client device can more easily reproduce 3D data using the spatial scalability.

For example, as the spatial scalability information, the base enhancement grouping information designating the selection order (layer) of each group (sparse patch) such as which group (sparse patch) is set as the base layer and which group (sparse patch) is set as the enhancement layer may be stored in the system layer.

By doing so, the client device can easily grasp which group is needed for constructing the point cloud of the desired LoD on the basis of the spatial scalability information. Therefore, the client device can more easily select the point cloud of an appropriate LoD.

Furthermore, as illustrated in FIG. 20, the control information regarding the distribution of the bitstreams of respective layers (groups) may be stored in different adaptation sets (Adaptation Sets) of the MPD from each other. In a case of the example of FIG. 20, control information regarding each of a sparse patch including points indicated by white circles, a sparse patch including points indicated by black circles, a sparse patch including points indicated by gray circles, and a sparse patch including points indicated by hatched circles is stored in different adaptation sets from each other. By doing so, the client device can select the bitstream of a desired layer (group) by selecting an adaptation set to be decoded. That is, the client device can more easily acquire and decode the bitstream of the desired layer (group).

<Example of Spatial Scalability Information>

FIG. 21 is a diagram illustrating an example of syntax of the V3C3D region descriptor. As illustrated in FIG. 21, layer identification information (layerId) may be stored as the spatial scalability information in vpsr.spatialRegion.spatialScalabilityInfo of the V3C3D region descriptor. As in the case of ISOBMFF, the layer identification information is identification information indicating the layer corresponding to the sub-bitstream in which the control information is stored in the adaptation set corresponding to vpsr.spatialRegion.spatialScalabilityInfo. For example, layerId=0 indicates a base layer, and layerId=1 to 255 indicate enhancement layers.

That is, the file generation device may store the layer identification information (layerId) in the V3C3D region descriptor of the MPD, and the client device may select the sub-bitstream (adaptation set) on the basis of the layer identification information stored in the V3C3D region descriptor of the MPD. By doing so, the client device can grasp the layer corresponding to the sub-bitstream (sparse patch) in which the control information is stored in each adaptation set on the basis of the layer identification information. Therefore, the client device can more easily select and acquire a point cloud that achieves high definition in the order intended by the content creator. Therefore, the client device can more easily reproduce the 3D data by using the spatial scalability.

Furthermore, as illustrated in FIG. 21, in addition to the layer identification information, information (lod) regarding the resolution of a point cloud obtained by reconstructing a point cloud corresponding to each layer from the highest layer of the spatial scalability to the layer indicated by the layer identification information may be stored in vpsr.spatialRegion.spatialScalabilityInfo of the V3C3D region descriptor.

For example, in a case of layerId=0 is satisfied, the information (lod) regarding the resolution of this point cloud indicates the LoD value of the base layer. Furthermore, for example, in a case where layerId=0 is not satisfied, the information (lod) regarding the resolution of this point cloud indicates the LoD value obtained by simultaneously display-ing the point cloud from 0 to (layer_id−1). Note that the LoD value may be a reference value determined by a content creator. Note that, also in this case, the information (lod) regarding the resolution of the point cloud may not be signaled, and the value of layer_id may signal the informa-tion regarding the resolution of the point cloud. That is, the information (lod) regarding the resolution of the point cloud may be included in the layer identification information (layer_id). For example, the value of layer_id may also indicate the resolution (lod value) of the point cloud corre-sponding to each layer from the highest layer of the spatial scalability to the layer indicated by the layer identification information.

That is, the file generation device may store the informa-tion (lod) regarding the resolution of the point cloud in the V3C3D region descriptor of the MPD, and the client device may select the sub-bitstream (adaptation set) on the basis of the information regarding the resolution of the point cloud stored in the V3C3D region descriptor of the MPD. By doing so, the client device can more easily grasp which adaptation set needs to be selected in order to obtain the desired LoD. Therefore, the client device can more easily reproduce the 3D data by using the spatial scalability.

Furthermore, as illustrated in FIG. 21, in addition to the layer identification information, the spatial scalability iden-tification information (id) for identifying the spatial scal-ability may be stored in vpsr.spatialRegion.spatialScalabili-tyInfo of the V3C3D region descriptor. A group of spatial regions (SpatialRegion) having the same spatial scalability identification information (id) as each other provides the spatial scalability. That is, when a plurality of regions having the same spatial scalability identification information (id) as each other is combined, a high LoD point cloud can be obtained.

That is, the file generation device may store the spatial scalability identification information (id) in the V3C3D region descriptor of the MPD, and the client device may select the sub-bitstream (adaptation set) on the basis of the spatial scalability identification information (id) stored in the V3C3D region descriptor of the MPD. By doing so, the client device can more easily specify the group that provides the spatial scalability. Therefore, the client device can more easily reproduce the 3D data by using the spatial scalability.

<Another Example of Spatial Scalability information>

Note that, as in the example illustrated in FIG. 22, instead of signaling vpsr.spatialRegion.spatialScalabilityInfo@id, vpsr.spatialRegion.spatialScalabilityInfo and asIds corre-sponding to the number of layers may be signaled. At this time, a plurality of spatialScalabilityInfo under a specific vpsr.spatialRegion provides the spatial scalability.

<MPD Description Example>

FIG. 23 is a diagram illustrating a description example of the MPD in a case where such the present technology is applied. FIG. 24 illustrates a description example of the supplements property illustrated in the fifth line from the top in FIG. 23.

In a case of the example illustrated in FIG. 24, the spatial scalability identification information (id) and information (lod) regarding resolution of the point cloud are set and layer identification information (layerId) are illustrated as v3c: spatialScalabilityInfo.

Therefore, the client device can acquire the bitstream necessary for constructing the point cloud of the desired LoD on the basis of the MPD. That is, the client device can more easily reproduce 3D data using the spatial scalability.

<File Generation Device>

Figure 25:
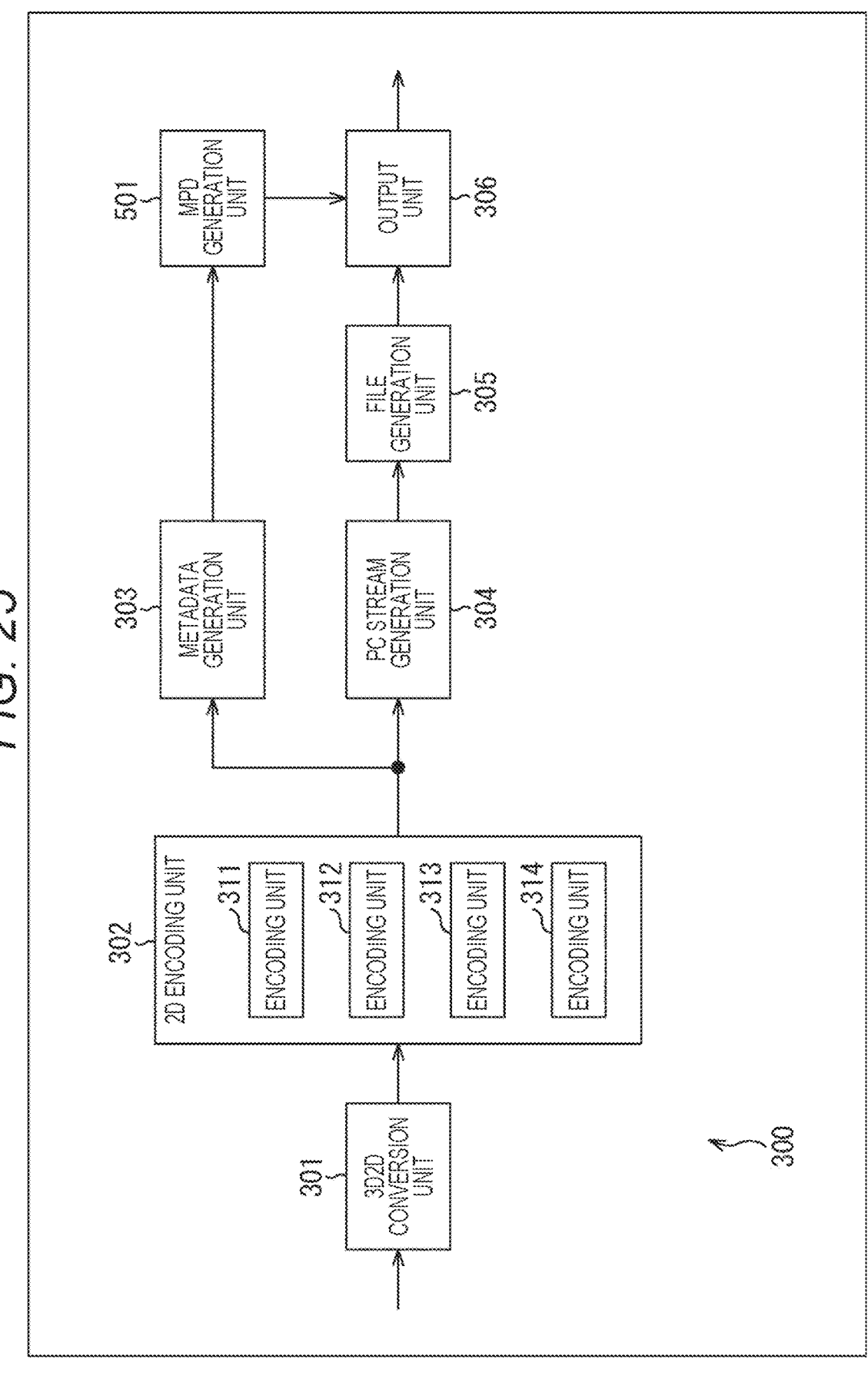
FIG. 25 is a block diagram illustrating a main configuration example of the file generation device.

FIG. 25 is a block diagram illustrating a main configu-ration example of the file generation device 300 in this case. That is, the file generation device 300 illustrated in FIG. 25 illustrates an example of a configuration of a file generation device that is an aspect of an information processing device to which the present technology is applied. A file generation device 300 illustrated in FIG. 25 is a device that applies V-PCC and encodes point cloud data as the video frame by the encoding method for two-dimensional images by apply-ing V-PCC. Furthermore, the file generation device 300 in this case generates an MPD that stores control information for controlling the distribution of the V3C bitstream gener-ated by the encoding.

At that time, the file generation device 300 applies the present technology described above in the present embodi-ment, and stores information in the MPD so as to enable the spatial scalability. That is, the file generation device 300 stores information regarding the spatial scalability in the MPD.

Note that while FIG. 25 illustrates main elements such as processing units and data flows, those depicted in FIG. 25 do not necessarily include all elements. That is, in the file generation device 300, there may be a processing unit not illustrated as a block in FIG. 25, or there may be processing or a data flow not illustrated as an arrow or the like in FIG. 25.

As illustrated in FIG. 25, the file generation device 300 includes an MPD generation unit 501 in addition to the configuration described with reference to FIG. 16.

In this case, the metadata generation unit 303 generates the metadata as in the case of FIG. 16. For example, the metadata generation unit 303 generates, as metadata, the spatial scalability information regarding the spatial scalabil-ity of the acquired sub-bitstream. That is, the metadata generation unit 303 generates the spatial scalability infor-mation by using any single method among the various methods described with reference to FIGS. 20 to 24 and the like or by appropriately combining any plurality of the methods. Note that the metadata generation unit 303 can generate any metadata other than the spatial scalability information.

When generating the metadata including the spatial scal-ability information in this manner, the metadata generation unit 303 supplies the metadata to the MPD generation unit 501.

The MPD generation unit 501 acquires the metadata including the spatial scalability information supplied from the metadata generation unit 303. The MPD generation unit 501 generates an MPD that stores the acquired metadata. That is, the MPD generation unit 501 stores the spatial scalability information in the MPD. That is, the MPD generation unit 501 stores the spatial scalability information in the system layer.

At that time, the MPD generation unit 501 stores the spatial scalability information in the MPD by using any single method among the various methods described with reference to FIGS. 20 to 24 and the like, or by appropriately combining any plurality of the methods. For example, as illustrated in FIG. 24, the MPD generation unit 501 stores the spatial scalability information in v3c: spatialScalabili-tyInfo of the MPD.

The MPD generation unit 501 supplies the generated MPD to the output unit 306. The output unit 306 outputs the supplied MPD (MPD including the spatial scalability information) to the outside of the file generation device 300 (for example, the distribution server, the client device, or the like).

As described above, the file generation device 300 applies the present technology described above in the present embodiment to generate the MPD that stores the spatial scalability information.

With such a configuration, it is possible to provide the spatial scalability information in the system layer to the client device that decodes the V3C bitstream. Therefore, the client device can more easily reproduce 3D data using the spatial scalability without requiring complicated work such as analyzing the V3C bitstream.

Note that these processing units (the 3D2D conversion unit 301 to the output unit 306, the MPD generation unit 501, and the encoding unit 311 to the encoding unit 314) have an arbitrary configuration. For example, each processing unit may be configured by a logic circuit that achieves the above-described processing. Furthermore, each processing unit may include, for example, a CPU, a ROM, a RAM, and the like, and execute a program using them, to thereby implement the above-described processing. Of course, each processing unit may have both the configurations, and a part of the above-described processing may be implemented by a logic circuit and the other may be implemented by executing a program. The configurations of the processing units may be independent from each other, and for example, a part of the processing units may implement a part of the above-described processing by a logic circuit, another part of the processing units may implement the above-described processing by executing a program, and still another of the processing units may implement the above-described processing by both the logic circuit and the execution of the program.

<Flow of File Generation Processing>

Figure 26:
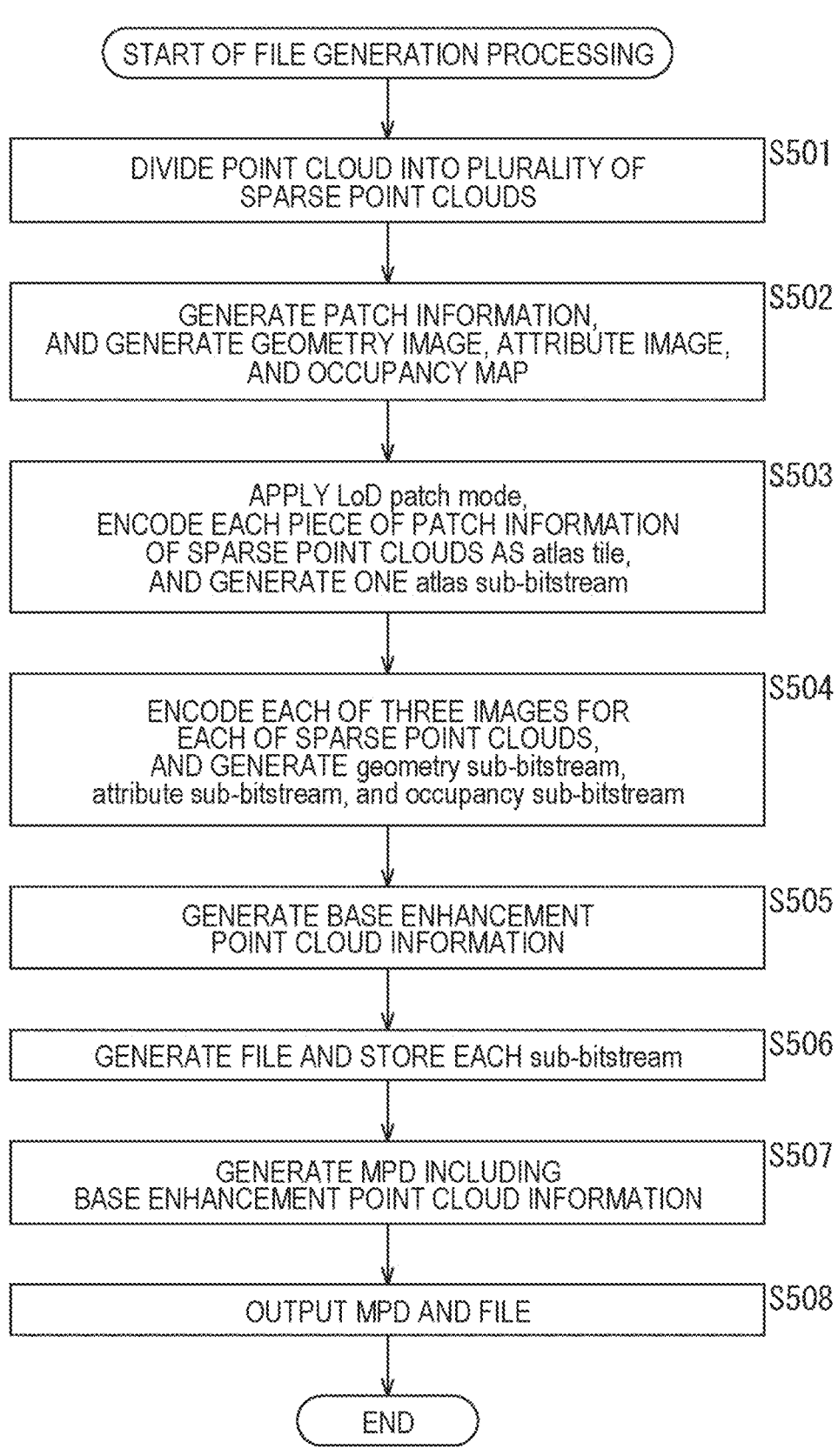
FIG. 26 is a flowchart illustrating an example of a flow of the file generation processing.

An example of a flow of file generation processing executed by the file generation device 300 in this case will be described with reference to a flowchart of FIG. 26.

When the file generation processing is started, each process of steps S501 to S505 is executed similarly to each process of steps S301 to S305 of FIG. 17.

In step S506, the file generation unit 305 generates a file and stores the V3C bitstream (each sub-bitstream) in the file.

In step S507, the MPD generation unit 501 generates an MPD that stores the spatial scalability information (for example, base enhancement point cloud information). At that time, the MPD generation unit 501 stores the spatial scalability information in the MPD by using any single method among the various methods described with reference to FIGS. 20 to 24 and the like, or by appropriately combining any plurality of the methods.

In step S508, the output unit 306 outputs the file generated in step S506 and the MPD generated in step S507 and storing the spatial scalability information to the outside of the file generation device 300 (for example, the distribution server or the like). When the process of step S508 ends, the file generation processing ends.

By executing each processing in this manner, it is possible to provide the spatial scalability information in the system layer to the client device that decodes the V3C bitstream. Therefore, the client device can more easily reproduce 3D data using the spatial scalability without requiring complicated work such as analyzing the V3C bitstream.

<Client Device>

Figure 27:
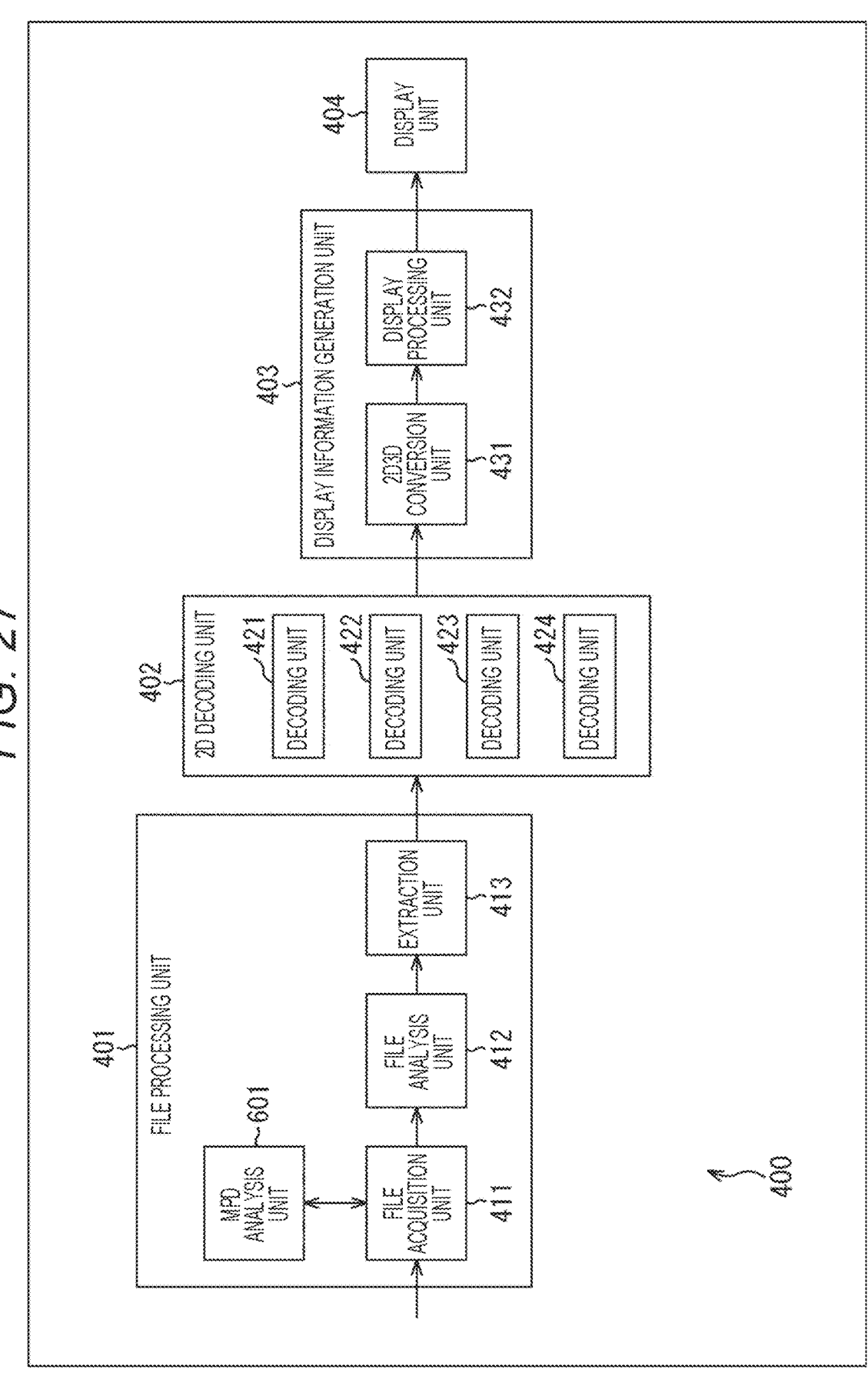
FIG. 27 is a block diagram illustrating a main configuration example of the client device.

The present technology described above in the present embodiment can be applied not only to the file generation device but also to the client device. FIG. 27 is a block diagram illustrating a main configuration example of the client device 400 in this case. That is, the client device 400 illustrated in FIG. 27 illustrates an example of a configuration of a client device that is an aspect of an information processing device to which the present technology is applied. A client device 400 illustrated in FIG. 27 is a device that applies V-PCC, acquires, on the basis of the MPD, the V3C bitstream (geometry video sub-bitstream, attribute video sub-bitstream, occupancy video sub-bitstream, and atlas sub-bitstream, or a collection thereof) encoded by the encoding method for two-dimensional images using the point cloud data as the video frame, decodes the V3C bitstream by a decoding method for two-dimensional images, and generates (reconstructs) the point cloud. For example, the client device 400 can acquire and decode the V3C bitstream on the basis of the MPD generated by the file generation device 300 to generate the point cloud.

At that time, the client device 400 achieves the spatial scalability by using any single method among the various methods of the present technology described above in the present embodiment, or by appropriately combining any plurality of the methods. That is, the client device 400 selects and acquires a bitstream (track) necessary for reconstructing the point cloud of the desired LoD on the basis of the spatial scalability information stored in the MPD.

Note that while FIG. 27 illustrates main elements such as processing units and data flows, those depicted in FIG. 27 do not necessarily include all elements. That is, in the client device 400, there may be a processing unit not illustrated as a block in FIG. 27, or there may be processing or a data flow not illustrated as an arrow or the like in FIG. 27.

As illustrated in FIG. 27, the client device 400 includes an MPD analysis unit 601 in addition to the configuration illustrated in FIG. 18.

The MPD analysis unit 601 analyzes the MPD acquired by the file acquisition unit 411, selects the bitstream to be decoded, and causes the file acquisition unit 411 to acquire the bitstream.

At that time, the MPD analysis unit 601 analyzes the MPD by using any single method among the various methods of the present technology described in the present embodiment or by appropriately combining any plurality of the methods. For example, the MPD analysis unit 601 analyzes the spatial scalability information stored in the MPD, and selects the sub-bitstream to be decoded. For example, on the basis of the spatial scalability information, the MPD analysis unit 601 selects a combination of point clouds (that is, the sub-bitstream to be decoded) that provide the spatial scalability according to the network environment or the processing capability of the client device 400 itself. The MPD analysis unit 601 controls the file acquisition unit 411 on the basis of the analysis result to acquire the selected bitstream.

In this case, the file acquisition unit 411 acquires the MPD from the distribution server or the like and supplies the MPD to the MPD analysis unit 601. Furthermore, the file acquisition unit 411 is controlled by the MPD analysis unit 601, acquires a file including the bitstream selected by the MPD analysis unit 601 from the distribution server or the like, and supplies the file to the file analysis unit 412.

The file analysis unit 412 analyzes the file, and the extraction unit 413 extracts a bitstream on the basis of the analysis result and supplies the bitstream to the 2D decoding unit 402.

The 2D decoding unit 402 to the display unit 404 perform processing similar to that in a case of FIG. 18.

With such a configuration, the client device 400 can identify a combination of point clouds that provides the spatial scalability on the basis of the spatial scalability information stored in the system layer. Therefore, for example, in the V-PCC content distribution, the client device can select an appropriate point cloud of LoD according to the client environment without requiring complicated work such as analyzing the bitstream. That is, the client device can more easily reproduce 3D data using the spatial scalability.

Note that these processing units (the file processing unit 401 to the display unit 404, the file acquisition unit 311 to the extraction unit 413, the decoding unit 421 to the decoding unit 424, the 2D3D conversion unit 431 and the display processing unit 432, and the MPD analysis unit 601) have an arbitrary configuration. For example, each processing unit may be configured by a logic circuit that achieves the above-described processing. Furthermore, each processing unit may include, for example, a CPU, a ROM, a RAM, and the like, and execute a program using them, to thereby implement the above-described processing. Of course, each processing unit may have both the configurations, and a part of the above-described processing may be implemented by a logic circuit and the other may be implemented by executing a program. The configurations of the processing units may be independent from each other, and for example, a part of the processing units may implement a part of the above-described processing by a logic circuit, another part of the processing units may implement the above-described processing by executing a program, and still another of the processing units may implement the above-described processing by both the logic circuit and the execution of the program.

<Flow of Client Processing>

Figure 28:
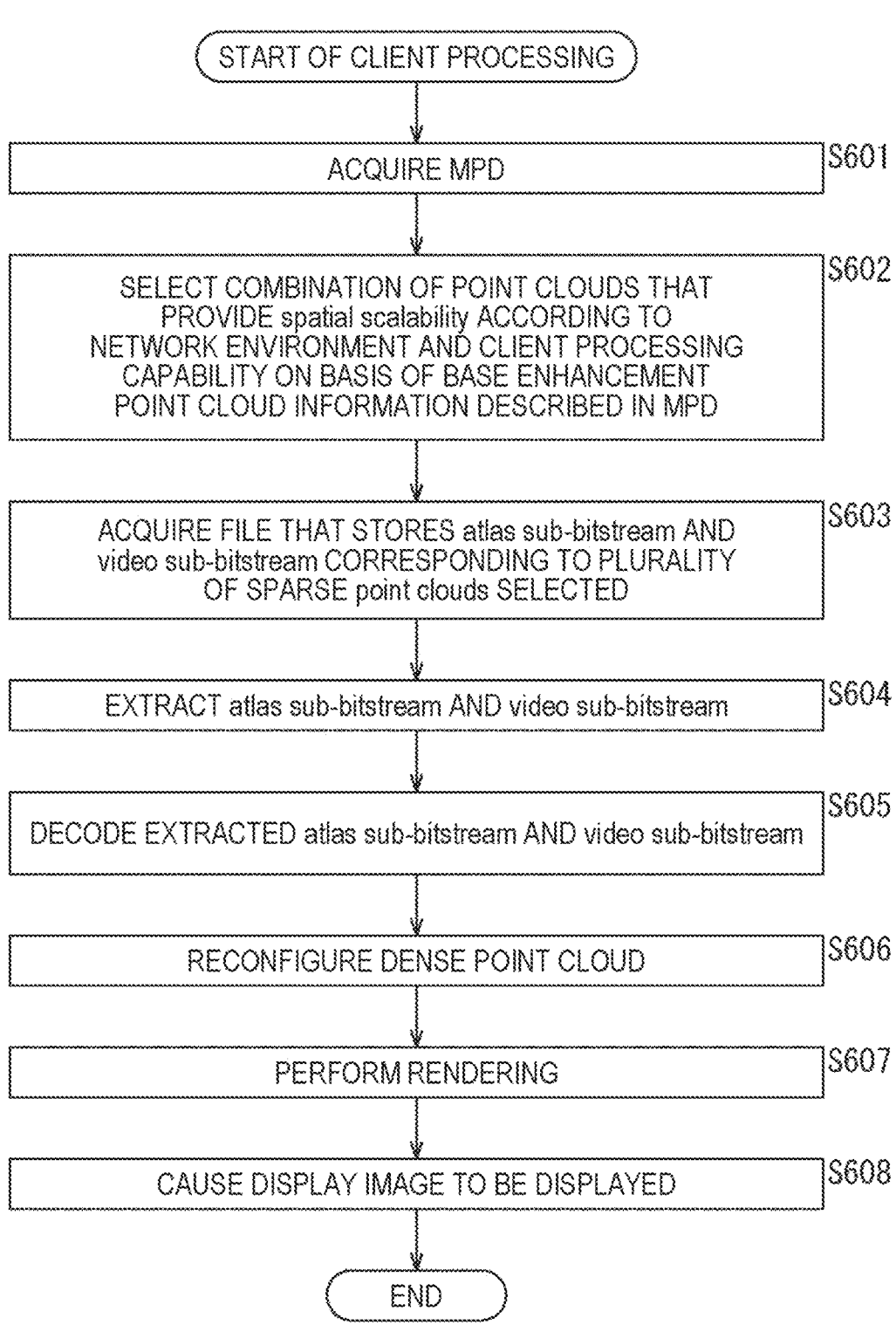
FIG. 28 is a flowchart illustrating an example of a flow of the client processing.

An example of a flow of client processing executed by the client device 400 will be described with reference to a flowchart of FIG. 28.

When the client processing is started, the file acquisition unit 411 of the client device 400 acquires the MPD in step S601.

In step S602, the MPD analysis unit 601 selects a combination of point clouds that provides the spatial scalability according to the network environment and client processing capability on the basis of the spatial scalability information (base enhancement point cloud information) described in the MPD.

In step S603, the file acquisition unit 411 acquires a file that stores the atlas sub-bitstream and the video sub-bitstream corresponding to a plurality of sparse point clouds selected in step S602.

In step S604, the extraction unit 413 extracts the truss sub-bitstream and the video sub-bitstream from the file.

Figure 19:
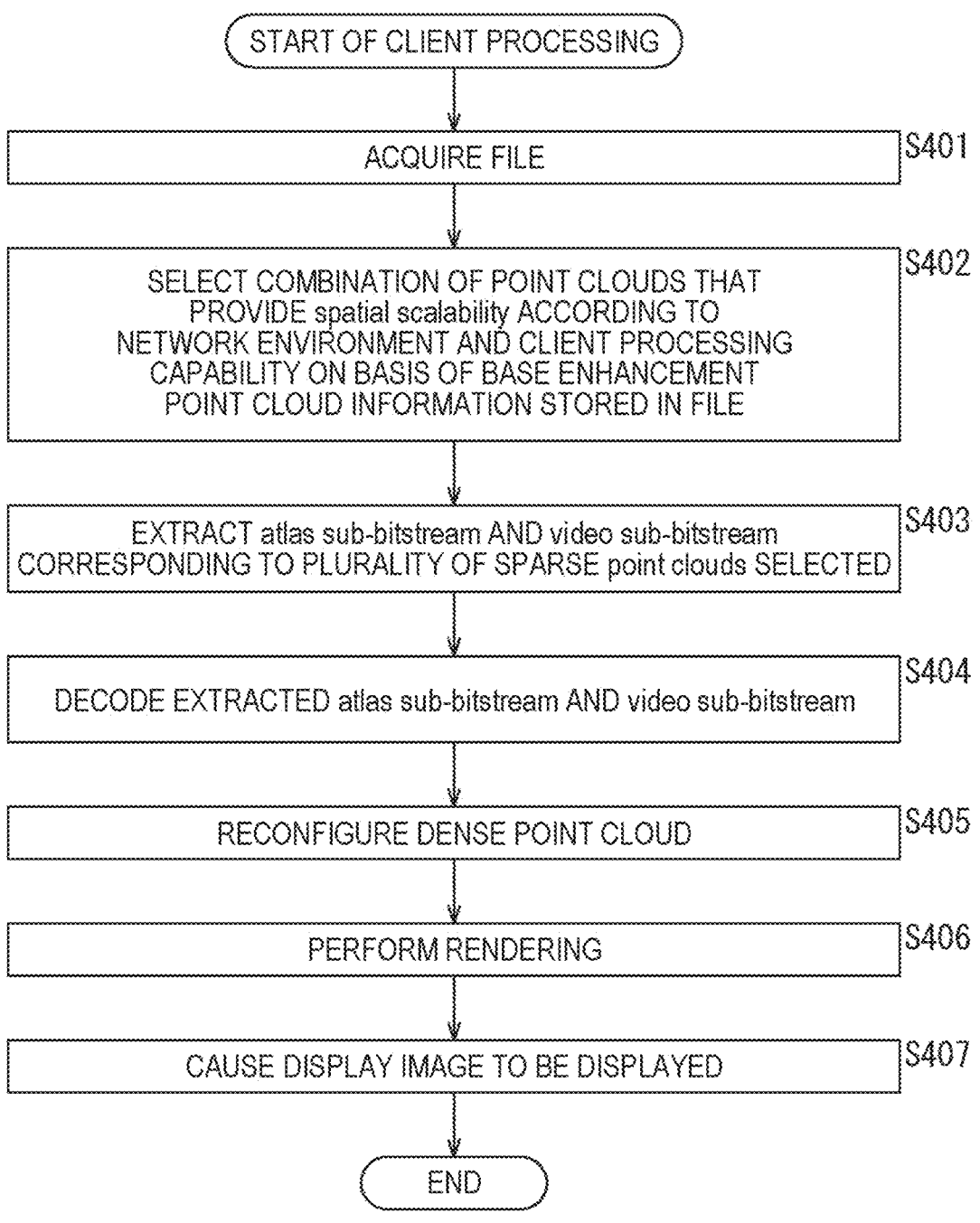
FIG. 19 is a flowchart illustrating an example of a flow of client processing.

Respective processes of steps S605 to S608 are executed similarly to respective processes of steps S404 to S407 of FIG. 19.

When the process of step S608 ends, the client processing ends.

By executing each processing as described above, the client device 400 can identify a combination of point clouds that provides the spatial scalability on the basis of the spatial scalability information stored in the system layer. Therefore, for example, in the V-PCC content distribution, the client device can select an appropriate point cloud of LoD according to the client environment without requiring complicated work such as analyzing the bitstream. That is, the client device can more easily reproduce 3D data using the spatial scalability.

4. Appendix

<Computer>

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

Figure 29:
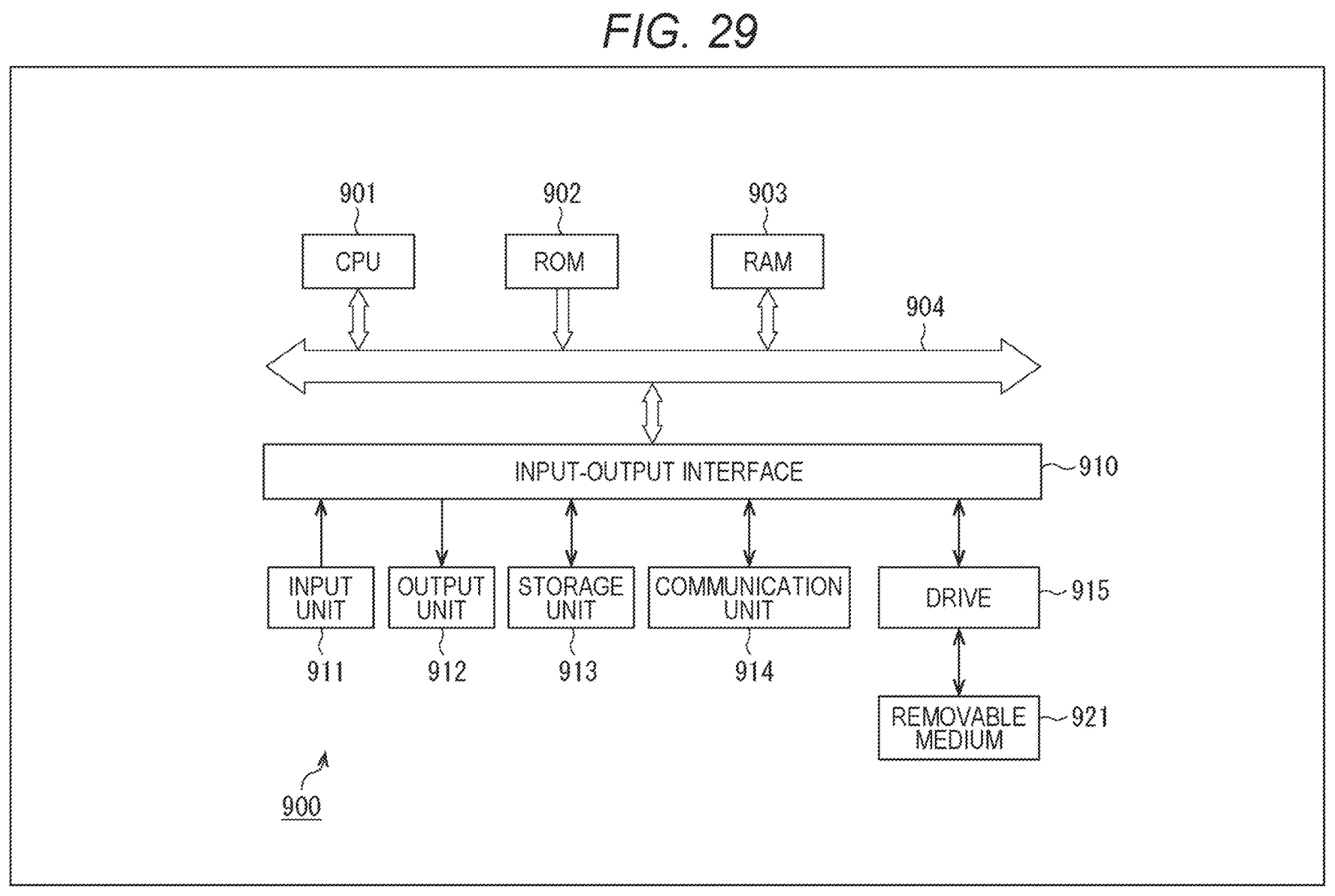

FIG. 29 is a block diagram illustrating a configuration example of hardware of a computer that executes the above-described series of processes by a program.

In a computer 900 illustrated in FIG. 29, a central processing unit (CPU) 901, a read only memory (ROM) 902, and a random access memory (RAM) 903 are interconnected via a bus 904.

An input-output interface 910 is also connected to the bus 904. An input unit 911, an output unit 912, a storage unit 913, a communication unit 914, and a drive 915 are connected to the input-output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable medium 921 such as a magnetic disk, an optical disk, a magneto-optical disk, or a semiconductor memory.

In the computer configured as described above, the CPU 901 loads, for example, a program stored in the storage unit 913 into the RAM 903 via the input-output interface 910 and the bus 904 and executes the program, so as to perform the above-described series of processes. The RAM 903 also appropriately stores data and the like necessary for the CPU 901 to execute various processes.

The program executed by the computer can be applied by being recorded in the removable medium 921 as a package medium or the like, for example. In this case, the program can be installed in the storage unit 913 via the input-output interface 910 by attaching the removable medium 921 to the drive 915.

Furthermore, this program can be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

<Target to which Present Technology is Applicable>

Although the case where the present technology is applied to encoding and decoding of point cloud data has been described above, the present technology is not limited to these examples, and can be applied to encoding and decoding of 3D data of any standard. That is, as long as there is no contradiction with the present technology described above, specifications of various types of processing such as encoding and decoding methods and various types of data such as 3D data and metadata are arbitrary. Furthermore, as long as there is no contradiction with the present technology, a part of processes and specifications described above may be omitted.

Furthermore, the present technology can be applied to any configuration. For example, the present technology can be applied to various electronic devices.

Furthermore, for example, the present technology can also be implemented as a configuration of a part of the device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that in the present description, the system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are all systems.

<Field and Application to which Present Technology is Applicable>

Note that the system, device, processing unit, and the like to which the present technology is applied can be used in any fields, for example, traffic, medical care, crime prevention, agriculture, livestock industry, mining, beauty, factory, household appliance, weather, nature monitoring, and the like. Furthermore, its use is arbitrary.

For example, the present technology can be applied to systems and devices used for providing contents for appreciation and the like. Furthermore, for example, the present technology can also be applied to systems and devices used for traffic, such as traffic condition management and automated driving control. Moreover, for example, the present technology can also be applied to systems and devices used for security. Furthermore, for example, the present technology can be applied to systems and devices used for automatic control of a machine or the like. Moreover, for example, the present technology can also be applied to systems and devices provided for use in agriculture and livestock industry. Furthermore, the present technology can also be applied to systems and devices that monitor, for example, the status of nature such as a volcano, a forest, and the ocean, wildlife, and the like. Moreover, for example, the present technology can also be applied to systems and devices used for sports.

<Others>

Note that in the present description, the "flag" is information for identifying a plurality of states, and includes not only information used for identifying two states of true (1) or false (0), but also information that can identify three or more states. Therefore, the value that this "flag" can take may be, for example, two values of 1 and 0, or three or more values. That is, the number of bits constituting this "flag" is arbitrary, and may be one bit or a plurality of bits. Furthermore, identification information (including the flag) is assumed to include not only identification information thereof in a bitstream but also difference information of the identification information with respect to a certain reference information in the bitstream, and thus, in the present description, the "flag" and "identification information" include not only the information thereof but also the difference information with respect to the reference information.

Furthermore, various types of information (metadata and the like) related to the coded data (bitstream) may be transmitted or recorded in any form as long as the information is associated with the coded data. Here, the term "associate" means, for example, that one piece of data can be used (linked) when the other piece of data is processed. That is, the data associated with each other may be combined as one piece of data or may be individual pieces of data. For example, information associated with coded data (image) may be transmitted on a transmission path different from that of the coded data (image). Furthermore, for example, the information associated with the coded data (image) may be recorded in a recording medium (or another recording area of the same recording medium) different from the coded data (image). Note that this "association" may be a part of data instead of the entire data. For example, an image and information corresponding to the image may be associated with each other in an arbitrary unit such as a plurality of frames, one frame, or a part of the frame.

Note that in the present description, terms such as "combine", "multiplex", "add", "integrate", "include", "store", "put in", "plug in", and "insert" mean to combine a plurality of items into one, for example, such as combining coded data and metadata into one piece of data, and mean one method of the above-described "association".

Furthermore, the embodiments of the present technology are not limited to the above-described embodiments, and various modifications are possible without departing from the scope of the present technology.

For example, a configuration described as one device (or processing unit) may be divided and configured as a plurality of devices (or processing units). Conversely, configurations described above as a plurality of devices (or processing units) may be combined and configured as one device (or processing unit). Furthermore, a configuration other than those described above may of course be added to the configuration of each device (or each processing unit). Moreover, if the configuration and operation of the entire system are substantially the same, a part of the configuration of a certain device (or processing unit) may be included in the configuration of another device (or another processing unit).

Furthermore, for example, the above-described program may be executed in any device. In that case, it is sufficient if the device has necessary functions (functional blocks and the like) and can acquire necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step can be executed as processes of a plurality of steps. Conversely, a process described as a plurality of steps can be collectively executed as one step.

Furthermore, for example, in the program executed by the computer, processes in steps for describing the program may be executed in time series in the order described in the present description, or may be executed in parallel or individually at necessary timing such as when a call is made. That is, as long as no contradiction occurs, the processes in the respective steps may be executed in an order different from the above-described orders. Moreover, the processes in steps for describing this program may be executed in parallel with processes in another program, or may be executed in combination with processes in another program.

Furthermore, for example, a plurality of technologies related to the present technology can be implemented independently as a single body as long as there is no contradiction. Of course, any plurality of the present technologies can also be used and implemented in combination. For example, part or all of the present technologies described in any of the embodiments can be implemented in combination with part or all of the present technologies described in other embodiments. Furthermore, part or all of any of the above-described present technologies can be implemented by using together with another technology that is not described above.

Note that the present technology can have configurations as follows.

(1) An information processing device, including:

an encoding unit that encodes two-dimensional (2D) data obtained by two-dimensionally converting a point cloud representing an object having a three-dimensional shape as a set of points and corresponding to spatial scalability, and generates a bitstream including a sub-bitstream obtained by encoding the point cloud corresponding to a single or plurality of layers of the spatial scalability;

a spatial scalability information generation unit that generates spatial scalability information regarding the spatial scalability of the sub-bitstream; and a file generation unit that generates a file that stores the bitstream generated by the encoding unit and the spatial scalability information generated by the spatial scalability information generation unit.

(2) The information processing device according to (1), in which the spatial scalability information includes layer identification information indicating the layer corresponding to the sub-bitstream stored in a track group of the file.

(3) The information processing device according to (2), in which the spatial scalability information further includes information regarding resolution of the point cloud obtained by reconstructing the point cloud corresponding to each layer from a highest layer of the spatial scalability to the layer indicated by the layer identification information.

(4) The information processing device according to (3), in which the spatial scalability information further includes spatial scalability identification information for identifying the spatial scalability.

(5) An information processing method, including:

encoding 2D data obtained by two-dimensionally converting a point cloud representing an object having a three-dimensional shape as a set of points and corresponding to spatial scalability, and generating a bitstream including a sub-bitstream obtained by encoding the point cloud corresponding to a single or plurality of layers of the spatial scalability;

generating spatial scalability information regarding the spatial scalability of the sub-bitstream; and generating a file that stores the bitstream generated and the spatial scalability information generated.

(6) An information processing device, including:

a selection unit that selects a layer of spatial scalability to be decoded on the basis of spatial scalability information stored in a file and regarding the spatial scalability of a bitstream obtained by encoding 2D data obtained by two-dimensionally converting a point cloud representing an object having a three-dimensional shape as a set of points and corresponding to the spatial scalability;

an extraction unit that extracts a sub-bitstream corresponding to the layer selected by the selection unit from the bitstream stored in the file; and a decoding unit that decodes the sub-bitstream extracted by the extraction unit.

(7) The information processing device according to (6), in which the selection unit selects the layer of the spatial scalability to be decoded on the basis of layer identification information that is included in the spatial scalability information and indicates the layer corresponding to the sub-bitstream stored in the track group of the file.

(8) The information processing device according to (7), in which the selection unit further selects the layer of the spatial scalability to be decoded on the basis of information included in the spatial scalability information and regarding resolution of the point cloud obtained by reconstructing the point cloud corresponding to each layer from a highest layer of the spatial scalability to the layer indicated by the layer identification information.

(9) The information processing device according to (8), in which the selection unit further selects the layer of the spatial scalability to be decoded on the basis of spatial scalability identification information for identifying the spatial scalability included in the spatial scalability information.

(10) An information processing method, including:

selecting a layer of spatial scalability to be decoded on the basis of spatial scalability information stored in a file and regarding the spatial scalability of a bitstream obtained by encoding 2D data obtained by two-dimensionally converting a point cloud representing an object having a three-dimensional shape as a set of points and corresponding to the spatial scalability;

extracting a sub-bitstream corresponding to the selected layer from the bitstream stored in the file; and decoding the extracted sub-bitstream.

(11) An information processing device, including:

an encoding unit that encodes 2D data obtained by two-dimensionally converting a point cloud representing an object having a three-dimensional shape as a set of points and corresponding to spatial scalability, and generates a bitstream including a sub-bitstream obtained by encoding the point cloud corresponding to a single or plurality of layers of the spatial scalability;

a spatial scalability information generation unit that generates spatial scalability information regarding the spatial scalability of the sub-bitstream; and a control file generation unit that generates a control file that stores the spatial scalability information generated by the spatial scalability information generation unit and control information regarding distribution of the bitstream generated by the encoding unit.

(12) The information processing device according to (11), in which the spatial scalability information includes layer identification information indicating the layer corresponding to the sub-bitstream in which the control information is stored in an adaptation set of the control file.

(13) The information processing device according to (12), in which the spatial scalability information further includes information regarding resolution of the point cloud obtained by reconstructing the point cloud corresponding to each layer from a highest layer of the spatial scalability to the layer indicated by the layer identification information.

(14) The information processing device according to (13), in which the spatial scalability information further includes spatial scalability identification information for identifying the spatial scalability.

(15) An information processing method, including:

encoding 2D data obtained by two-dimensionally converting a point cloud representing an object having a three-dimensional shape as a set of points and corresponding to spatial scalability, and generating a bitstream including a sub-bitstream obtained by encoding the point cloud corresponding to a single or plurality of layers of the spatial scalability;

generating spatial scalability information regarding the spatial scalability of the sub-bitstream; and generating a control file that stores the spatial scalability information generated and control information regarding distribution of the bitstream generated.

(16) An information processing device, including:

a selection unit that selects a layer of spatial scalability to be decoded on the basis of spatial scalability information stored in a control file storing control information regarding distribution of a bitstream, the spatial scalability information regarding the spatial scalability of the bitstream obtained by encoding 2D data obtained by two-dimensionally converting a point cloud representing an object having a three-dimensional shape as a set of points and corresponding to the spatial scalability;

an acquisition unit that acquires a sub-bitstream corresponding to the layer selected by the selection unit; and a decoding unit that decodes the sub-bitstream acquired by the acquisition unit.

(17) The information processing device according to (16), in which the selection unit selects the layer of the spatial scalability to be decoded on the basis of layer identification information that is included in the spatial scalability information and indicates the layer corresponding to the sub-bitstream in which the control information is stored in an adaptation set of the control file.

(18) The information processing device according to (17), in which the selection unit further selects the layer of the spatial scalability to be decoded on the basis of information included in the spatial scalability information and regarding resolution of the point cloud obtained by reconstructing the point cloud corresponding to each layer from a highest layer of the spatial scalability to the layer indicated by the layer identification information.

(19) The information processing device according to (18), in which the selection unit further selects the layer of the spatial scalability to be decoded on the basis of spatial scalability identification information for identifying the spatial scalability included in the spatial scalability information.

(20) An information processing method, including:

selecting a layer of spatial scalability to be decoded on the basis of spatial scalability information stored in a control file storing control information regarding distribution of a bitstream, the spatial scalability information regarding the spatial scalability of the bitstream obtained by encoding 2D data obtained by two-dimensionally converting a point cloud representing an object having a three-dimensional shape as a set of points and corresponding to the spatial scalability;

acquiring a sub-bitstream corresponding to the selected layer; and decoding the acquired sub-bitstream.

REFERENCE SIGNS LIST

300 File generation device
301 3D2D conversion unit
302 2D encoding unit
303 Metadata generation unit
304 PC stream generation unit
305 File generation unit
306 Output unit
311 to 314 Encoding unit
400 Client device
401 File processing unit
402 2D decoding unit
403 Display information generation unit
404 Display unit
411 File acquisition unit
412 File analysis unit
413 Extraction unit
421 to 424 Decoding unit
431 2D3D conversion unit
432 Display processing unit
501 MPD generation unit
601 MPD analysis unit

The invention claimed is:

1. An information processing device, comprising:

processing circuitry configured to:

select a layer of spatial scalability to be decoded on a basis of spatial scalability information stored in a control file storing control information regarding distribution of a bitstream, the spatial scalability information including:

(i) layer identification information, (ii) information regarding resolution of a point cloud, and (iii) spatial scalability identification information for a sub-bitstream encoded from 3D data corresponding to the spatial scalability;

acquire a sub-bitstream corresponding to the selected layer; and decode the acquired sub-bitstream-acquired by the acquisition unit.

2. The information processing device according to claim 1, wherein the processing circuitry is configured to select the layer a basis of the layer identification information that is included in the spatial scalability information.

3. The information processing device according to claim 2, wherein the processing circuitry is configured to select the layer on a basis of the information regarding the resolution of the point cloud that is included in the spatial scalability information, the information regarding the resolution of the point cloud indicating a level of detail obtained by reconstructing the point cloud from a highest layer to the layer indicated by the layer identification information.

4. The information processing device according to claim 3, wherein the processing circuitry is configured to select the layer on a basis of the spatial scalability identification information that is included in the spatial scalability information.

5. An information processing method, comprising:

selecting a layer of spatial scalability to be decoded on a basis of spatial scalability information stored in a control file storing control information regarding distribution of a bitstream, the spatial scalability information including:

(i) layer identification information, (ii) information regarding resolution of a point cloud, and (iii) spatial scalability identification information for a sub-bitstream encoded from 3D data corresponding to the spatial scalability;

acquiring a sub-bitstream corresponding to the selected layer; and decoding the acquired sub-bitstream.

* * * * *